US007734731B2

(12) United States Patent
Ordille et al.

(10) Patent No.: US 7,734,731 B2
(45) Date of Patent: Jun. 8, 2010

(54) METHOD AND APPARATUS FOR A PUBLISH-SUBSCRIBE SYSTEM WITH THIRD PARTY SUBSCRIPTION DELIVERY

(75) Inventors: Joann J. Ordille, South Orange, NJ (US); Patrick Tendick, Basking Ridge, NJ (US); John Hamilton Slye, Bridgewater, NJ (US); Qian Yang, Bound Brook, NJ (US)

(73) Assignee: Avaya Inc., Basking Ridge, NJ (US)

( * ) Notice: Subject to any disclaimer, the term of this patent is extended or adjusted under 35 U.S.C. 154(b) by 957 days.

(21) Appl. No.: 10/999,891

(22) Filed: Nov. 30, 2004

(65) Prior Publication Data

US 2005/0208941 A1 Sep. 22, 2005

Related U.S. Application Data

(60) Provisional application No. 60/554,232, filed on Mar. 18, 2004.

(51) Int. Cl.
G06F 15/13 (2006.01)

(52) U.S. Cl. .................. 709/219; 709/203; 709/216; 709/226; 709/229; 709/230; 707/3; 707/4

(58) Field of Classification Search .............. 709/203, 709/216, 219, 226, 229, 230; 707/3, 4
See application file for complete search history.

(56) References Cited

U.S. PATENT DOCUMENTS 5,509,000 A    4/1996  Oberlander
5,559,867 A    9/1996  Langsenkamp et al.
5,742,668 A    4/1998  Pepe et al.
5,812,865 A    9/1998  Theimer et al.
5,859,967 A    1/1999  Kaufeld et al.

(Continued)

FOREIGN PATENT DOCUMENTS

CA    2486135 A1    11/2003

(Continued)

OTHER PUBLICATIONS

Lennox et al., "CPL: A Language for User Control of Internet Telephony Services", Nov. 21, 2001.

(Continued)

*Primary Examiner*—Jinsong Hu
(74) *Attorney, Agent, or Firm*—Joseph B. Ryan; Jason Paul DeMont; Wayne S. Breyer

(57) ABSTRACT

Methods and apparatus are disclosed for notifying one or more users of information. One or more users are identified that have entered a subscription that matches the information; and a communication flow expression is generated that contains at least one primitive keyword indicating how a notification to the identified users should be processed. The communication flow expression may be provided, for example, to a third party for delivery. Typically, a request identifier is received back from the third party and forwarded to the application associated with the information. The communication flow expression comprises at least one recipient for the notification. The identified users may be required to have appropriate privileges associated with the information before being added to the communication flow expression.

19 Claims, 20 Drawing Sheets

U.S. PATENT DOCUMENTS

| | | | |
|---|---|---|---|
| 5,892,906 A | | 4/1999 | Chou et al. |
| 5,912,947 A | | 6/1999 | Langsenkamp et al. |
| 5,983,265 A | | 11/1999 | Martino, II |
| 5,999,978 A | | 12/1999 | Angal et al. |
| 6,098,099 A | * | 8/2000 | Ellesson et al. ............. 709/223 |
| 6,112,246 A | * | 8/2000 | Horbal et al. ............... 709/230 |
| 6,158,007 A | | 12/2000 | Moreh et al. |
| 6,195,703 B1 | | 2/2001 | Blumenau et al. |
| 6,205,148 B1 | | 3/2001 | Takahashi et al. |
| 6,404,880 B1 | | 6/2002 | Stevens |
| 6,442,565 B1 | | 8/2002 | Tyra et al. |
| 6,446,114 B1 | | 9/2002 | Bulfer et al. |
| 6,456,594 B1 | | 9/2002 | Kaplan et al. |
| 6,457,046 B1 | * | 9/2002 | Munakata ................... 709/216 |
| 6,463,462 B1 | | 10/2002 | Smith et al. |
| 6,557,054 B2 | | 4/2003 | Reisman |
| 6,633,630 B1 | | 10/2003 | Owens et al. |
| 6,643,684 B1 | | 11/2003 | Malkin et al. |
| 6,643,705 B1 | | 11/2003 | Wallace et al. |
| 6,671,715 B1 | * | 12/2003 | Langseth et al. ............ 709/203 |
| 6,680,943 B1 | | 1/2004 | Gibson et al. |
| 6,687,742 B1 | | 2/2004 | Iwazaki |
| 6,868,498 B1 | | 3/2005 | Katsikas |
| 6,886,043 B1 | | 4/2005 | Mauger et al. |
| 6,910,070 B1 | * | 6/2005 | Mishra et al. ............... 709/224 |
| 6,919,792 B1 | | 7/2005 | Battini et al. |
| 6,965,917 B1 | * | 11/2005 | Aloni et al. .................. 709/206 |
| 7,016,477 B2 | * | 3/2006 | Contractor ................... 379/45 |
| 7,032,030 B1 | | 4/2006 | Codignotto |
| 7,219,153 B1 | * | 5/2007 | Day .......................... 709/229 |
| 7,372,833 B2 | | 5/2008 | Kyronaho et al. |
| 2001/0018718 A1 | | 8/2001 | Ludtke et al. |
| 2001/0046234 A1 | | 11/2001 | Agrawal et al. |
| 2002/0035607 A1 | | 3/2002 | Checkoway et al. |
| 2002/0072348 A1 | | 6/2002 | Wheeler et al. |
| 2002/0072966 A1 | | 6/2002 | Eldering et al. |
| 2002/0103850 A1 | | 8/2002 | Moyer et al. |
| 2002/0103898 A1 | | 8/2002 | Moyer et al. |
| 2002/0112073 A1 | | 8/2002 | MeLampy et al. |
| 2002/0116336 A1 | | 8/2002 | Diacakis et al. |
| 2002/0184521 A1 | | 12/2002 | Lucovsky et al. |
| 2003/0014297 A1 | | 1/2003 | Kaufman et al. |
| 2003/0055829 A1 | | 3/2003 | Kambo et al. |
| 2003/0119531 A1 | | 6/2003 | Patton et al. |
| 2003/0135567 A1 | | 7/2003 | Reilly |
| 2003/0193558 A1 | | 10/2003 | Doss et al. |
| 2003/0195698 A1 | | 10/2003 | Jones |
| 2003/0229722 A1 | | 12/2003 | Beyda |
| 2004/0003058 A1 | | 1/2004 | Trossen |
| 2004/0006606 A1 | | 1/2004 | Marotta et al. |
| 2004/0015371 A1 | | 1/2004 | Thomas et al. |
| 2004/0015778 A1 | | 1/2004 | Britton et al. |
| 2004/0064387 A1 | | 4/2004 | Clarke et al. |
| 2004/0225733 A1 | | 11/2004 | Tesink et al. |
| 2005/0021383 A1 | | 1/2005 | Fliess et al. |
| 2005/0086469 A1 | | 4/2005 | Dunagan et al. |
| 2005/0171958 A9 | | 8/2005 | Cheng et al. |
| 2005/0262016 A1 | | 11/2005 | Hill et al. |
| 2006/0056628 A1 | | 3/2006 | Todd |
| 2006/0067309 A1 | | 3/2006 | Zhakov et al. |
| 2006/0253585 A1 | | 11/2006 | Fein et al. |
| 2007/0168550 A1 | | 7/2007 | Wang et al. |
| 2007/0299685 A1 | | 12/2007 | Marsh |
| 2009/0110174 A1 | | 4/2009 | Gallant et al. |

FOREIGN PATENT DOCUMENTS

| | | |
|---|---|---|
| JP | 8008967 A | 1/1996 |
| JP | 9185655 A | 7/1997 |
| JP | 10171729 A | 6/1998 |
| KR | 20000037554 | 7/2000 |
| WO | 0065786 A1 | 11/2000 |
| WO | 0069132 A1 | 11/2000 |
| WO | 0154008 A2 | 7/2001 |
| WO | 02093886 A2 | 11/2002 |

OTHER PUBLICATIONS

Lennox et al., "CPL: A Language for User Control of Internet Telephony Services", Nov. 14, 2000, pp. 1-64, Publisher: Internet Engineering Task Force.

Rosenberg et al., "The Heart of Wireless UC Control: Communications Personalization", "The Unified-View", 2000-2001, pp. 1-5.

Murata et al., "Integrating routing and resource reservation mechanisms in real-time multicast protocols", "Proceedings of the 16th IEEE International Conference on Distributed Computing Systems XP010167618", May 27, 1996, pp. 141-148, Publisher: IEEE Computer Society.

Wang et al, "Security Issues and Requirements for Internet-Scale Publish-Subscribe Systems", "Proceedings of the 35th Hawaii International Conference on System Sciences", Sep. 2002, Publisher: IEEE.

Handley et al., "SIP: Session Initiation Protocol", "Network Working Group", Mar. 1999, pp. 1-153.

Schulzrinne et al., "SIP Caller Preferences and Callee Capabilities", "Internet Draft", Nov. 24, 2000, Publisher: Internet Engineering Task Force.

Dalgic et al., "True Number Portability and Advanced Call Screening in a SIP-Based IP Telephony System", "IEEE Communications Magazine XP000835310", Jul. 1999, pp. 96-101, vol. 37, No. 7, Publisher: IEEE.

"Wireless Access Protocol (WAP) 1.2.1", "http://www.wapforum.org/what/technical_1_2_1.htm", Jun. 2000, Publisher: WAP Forum Jun. 2000 (WAP 1.2.1) Specifications.

Tarumi et al., "Workflow Implementation with Rule-Based E-mail", "Journal of the Transactions of Information Processing Society of Japan", Jun. 15, 1995, pp. 1322-1331, vol. 36, No. 6, Publisher: Information Processing Society of Japan, Published in: JP.

Dinardo, Carla, "CA Application No. 2,447,436 Office Action Jun. 13, 2008", , Publisher: CIPO, Published in: CA.

"EP Application No. 02731823.7 Office Action Nov. 28, 2008", , Publisher: EPO, Published in: EP.

"EP Application No. 02 731 823.7 Office Action Dec. 23, 2009", , Publisher: EPO, Published in: EP.

Tauchi, K., "JP Application No. 2002-590633 Office Action Jan. 9, 2008", , Publisher: JPO, Published in: JP.

Sudo, T., "JP Application No. 2002-590633 Office Action Feb. 23, 2009", , Publisher: JPO, Published in: JP.

Sudo, T., "JP Application No. 2002-590633 Office Action Sep. 28, 2009", , Publisher: JPO, Published in: JP.

Won-Ho Gye, "KR Application No. 10-2003-7014910 Office Action Nov. 10, 2008", , Publisher: KIPO, Published in: KR.

Won-Ho Gye, "KR Application No. 10-2003-7014910 Office Action Jan. 14, 2010", , Publisher: KIPO, Published in: KR.

Won-Ho Gye, "KR Application No. 10-2003-7014910 Office Action Aug. 17, 2009", , Publisher: KIPO, Published in: KR.

Reddy, Jacinta, "PCT Application No. PCT/US2002/15513 Partial International Search Report Feb. 3, 2003", , Publisher: PCT, Published in: PCT.

Truong, Lan Dai T., "U.S. Appl. No. 10/184,236 Advisory Action Feb. 13, 2007", , Publisher: USPTO, Published in: IS.

Truong, Lan Dai T., "U.S. Appl. No. 10/184,236 Examiners Answer Brief Sep. 3, 2009", , Publisher: USPTO, Published in: US.

Truong, Lan Dai T., "U.S. Appl. No. 10/184,236 Office Action Mar. 10, 2006", , Publisher: USPTO, Published in: US.

Truong, Lan Dai T., "U.S. Appl. No. 10/184,236 Office Action Aug. 11, 2005", , Publisher: USPTO, Published in: US.

Truong, Lan Dai T., "U.S. Appl. No. 10/184,236 Office Action Sep. 1, 2006", , Publisher: USPTO, Published in: US.

"EP Application No. 05251609.3 Office Action Aug. 29, 2006", , Publisher: EPO, Published in: EP.

Garcia Bolos, R., "EP Application No. 05251609.3 European Search Report Jul. 27, 2005", , Publisher: EPO, Published in: EP.

Kim, Paul, "U.S. Appl. No. 10/999,890 Interview Summary Apr. 11, 2008", , Publisher: USPTO, Published in: US.

Kim, Paul, "U.S. Appl. No. 10/999,890 Office Action Dec. 27, 2007", , Publisher: USPTO, Published in: US.

Kim, Paul, "U.S. Appl. No. 10/999,890 Office Action Feb. 1, 2007", , Publisher: USPTO, Published in: US.

Kim, Paul, "U.S. Appl. No. 10/999,890 Office Action May 11, 2007", , Publisher: USPTO, Published in: US.

Kim, Paul, "U.S. Appl. No. 10/999,890 Office Action Aug. 17, 2007", , Publisher: USPTO, Published in: US.

Kim, Paul, "U.S. Appl. No. 10/999,890 Office Action Aug. 29, 2008", , Publisher: USPTO, Published in: US.

"EP Application No. 05251608.5 Office Action Apr. 6, 2006", , Publisher: EPO, Published in: EP.

"EP Application No. 05251608.5 Office Action Sep. 27, 2006", , Publisher: EPO, Published in: EP.

Garcia Bolos, R., "EP Application No. 05251608.5 Search Report Jul. 27, 2005", , Publisher: EPO, Published in: EP.

Garcia, Bolos R., "EP Application No. 05251608.5 Summons Sep. 17, 2008", , Publisher: EPO, Published in: EP.

Truong, Lan Dai T., "U.S. Appl. No. 10/999,909 Office Action Nov. 6, 2009", , Publisher: USPTO, Published in: US.

Truong, Lan Dai T., "U.S. Appl. No. 10/999,909 Office Action Feb. 6, 2009", , Publisher: USPTO, Published in: US.

Truong, Lan Dai T., "U.S. Appl. No. 10/999,909 Office Action Apr. 1, 2009", , Publisher: USPTO, Published in: US.

Truong, Lan Dai T., "U.S. Appl. No. 10/999,909 Office Action Jun. 9, 2008", , Publisher: USPTO, Published in: US.

"EP Application No. 05251607.7 Office Action Oct. 2, 2006", , Publisher: EPO, Published in: EP.

"EP Application No. 05251607.7 Office Action Apr. 18, 2006", , Publisher: EPO, Published in: EP.

"EP Application No. 05251607.7 Decision to Refuse Sep. 24, 2008", , Publisher: EPO, Published in: EP.

Garcia Bolos, R., "EP Application No. 05251607.7 European Search Report Jul. 27, 2005", , Publisher: EPO, Published in: EP.

"EP Application No. 05251607.7 Summons to Oral Proceedings Feb. 15, 2008", , Publisher: EPO, Published in: EP.

Porter, William Ernest, "U.S. Appl. No. 11/083,070 Office Action Mar. 3, 2010", , Publisher: USPTO, Published in: US.

Porter, William Ernest, "U.S. Appl. No. 11/083,070 Office Action Aug. 6, 2009", , Publisher: USPTO, Published in: US.

Truong, Lan Dai T., "US Appl. No. 11/743,994 Office Action Nov. 25, 2009", , Publisher: USPTO, Published in: US.

Truong, Lan Dai T., "US Appl. No. 11/743,994 Office Action Apr. 7, 2009", , Publisher: USPTO, Published in: US.

Garcia Bolos, Ruth, "EP Application No. 05251608.5 Decision to Refuse Mar. 20, 2009", , Publisher: EPO, Published in: EP.

* cited by examiner

FIG. 5

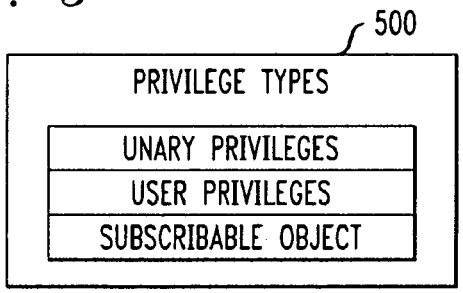

FIG. 6

USER DATABASE – 600

| LOGIN | NAME | TYPE |
|---|---|---|
| HAM | H. SLYE | USER |
| JOANN | J. ORDILLE | USER |
| YANGQIAN | Q. YANG | USER |
| PTENDICK | P. TENDICK | USER |
| NTANDON | DR. TANDON | USER |
| WEISS | DR. WEISS | USER |
| HOSP_APP | HOSPITAL APPLICATION | APPLICATION |
| XUI_USER | XUI USERS | ROLE |
| XUI_ADMIN | XUI ADMINISTRATORS | ROLE |
| HOSP_USER | HOSPITAL APP USERS | ROLE |
| HOSP_ADMIN | HOSPTIAL APP ADMINISTRATORS | ROLE |

FIG. 7

USER ROLES DATABASE – 700

| USER OR ROLE | HAS ROLE |
|---|---|
| HAM | XUI_ADMIN |
| JOANN | XUI_ADMIN |
| YANGQIAN | XUI_USER |
| PTENDICK | HOSP_ADMIN |
| NTANDON | HOSP_USER |
| WEISS | HOSP_USER |
| HOSP_USER | XUI_USER |
| HOSP_ADMIN | HOSP_USER |

FIG. 8

PRIVILEGES DATABASE – 800

| PRIVILEGE | ENABLES THE USER TO |
|---|---|
| CREATE ANY | CREATE ANY TYPE OF ENTITY IN THE SYSTEM FOR WHICH ACCESS CONTROLS APPLY, INCLUDING USERS, ROLES, ATTRIBUTES, ATTRIBUTE VALUES, SUBSCRIBABLE OBJECTS, AND NOTIFICATION REQUESTS. |
| CREATE ATTRIBUTE | CREATE AN ATTRIBUTE (e.g., PATIENT STATUS) THAT CAN BE USED TO QUALIFY REQUESTS THAT MATCH A SUBSCRIPTION. |
| CREATE REQUEST | CREATE A NOTIFICATION REQUEST, WHICH CAN THEN BE MATCHED AGAINST SUBSCRIPTIONS BY THE SUBSCRIPTION SERVER. |
| CREATE SUBSCRIBABLE OBJECT | CREATE A SUBSCRIBABLE OBJECT, e.g., PATIENT J. ORDILLE, TO WHICH USERS CAN SUBSCRIBE. |
| CREATE SUBSCRIPTION TO APPLICATION | CREATE A SUBSCRIPTION TO A SPECIFIC APPLICATION. |
| DELETE ANY | DELETE ANY ENTITY IN THE SYSTEM FOR WHICH ACCESS CONTROLS APPLY, INCLUDING USERS, ROLES, ATTRIBUTES, ATTRIBUTE VALUES, SUBSCRIBABLE OBJECTS, AND NOTIFICATION REQUESTS. |
| GRANT ANY | GRANT ANY ROLE OR PRIVILEGE. |
| NOTIFY | CAUSE A GIVEN USER TO BE NOTIFIED. FOR SUBSCRIPTION SERVICES, THIS MEANS CAUSING THE USER TO BE NOTIFIED BY MAKING THEM THE SUBSCRIBER OR DELEGATE ON A SUBSCRIPTION. |
| NOTIFY ANY | CAUSE ANY USER IN THE SYSTEM TO BE NOTIFIED. FOR SUBSCRIPTION SERVICES, THIS MEANS CAUSING A USER TO BE NOTIFIED BY MAKING THEM THE SUBSCRIBER OR DELEGATE ON A SUBSCRIPTION. |
| READ ANY | READ THE CONTENTS OF ANY ENTITY IN THE SYSTEM FOR WHICH ACCESS CONTROLS APPLY, INCLUDING USERS, ROLES, ATTRIBUTES, ATTRIBUTE VALUES, SUBSCRIBABLE OBJECTS, AND NOTIFICATION REQUESTS. |
| SUBSCRIBE ANY | CREATE A SUBSCRIPTION TO ANY SUBSCRIBABLE OBJECT. |
| SUBSCRIBE-TO | CREATE A SUBSCRIPTION TO A SPECIFIC SUBSCRIBABLE OBJECT. |
| SUBSCRIBE TO OBJECTS OWNED BY | CREATE A SUBSCRIPTION TO ANY SUBSCRIBABLE OBJECT OWNED BY A SPECIFIC APPLICATION. |
| UPDATE ANY | UPDATE THE CONTENTS OF ANY ENTITY IN THE SYSTEM FOR WHICH ACCESS CONTROLS APPLY, INCLUDING USERS, ROLES, ATTRIBUTES, ATTRIBUTE VALUES, SUBSCRIBABLE OBJECTS, AND NOTIFICATION REQUESTS. |

FIG. 9

USER PRIVILEGES DATABASE – 900

| USER OR ROLE | PRIVILEGE |
|---|---|
| XUI_ADMIN | CREATE ANY |
| XUI_ADMIN | READ ANY |
| XUI_ADMIN | UPDATE ANY |
| XUI_ADMIN | DELETE ANY |
| XUI_ADMIN | SUBSCRIBE ANY |
| XUI_ADMIN | NOTIFY ANY |
| XUI_ADMIN | GRANT ANY |
| HOSP_ADMIN | CREATE REQUEST |
| HOSP_ADMIN | NOTIFY ANY |
| HOSP_APP | CREATE SUBSCRIPTION |
| HOSP_APP | CREATE REQUEST |
| HOSP_APP | CREATE OBJECT |
| HOSP_APP | NOTIFY ANY |
| HOSP_APP | CREATE REQUEST |
| HOSP_APP | CREATE SUBSCRIBABLE OBJECT |
| HOSP_APP | CREATE ATTRIBUTE |

FIG. 10

USER-USER PRIVILEGES DATABASE – 1000

| USER OR ROLE | TARGET USER OR ROLE | PRIVILEGE |
|---|---|---|
| HOSP_USER | HOSP_APP | CREATE SUBSCRIPTION TO |
| HOSP_ADMIN | HOSP_APP | SUBSCRIBE TO OBJECTS OWNED BY |
| NTANDON | WEISS | NOTIFY |
| ⋮ | ⋮ | ⋮ |

FIG. 11

ATTRIBUTES DATABASE – 1100

| ATTRIBUTE NAME | DESCRIPTION |
|---|---|
| EVENT TYPE | THE TYPE OF EVENT THAT TRIGGERED THE NOTIFICATION, e.g., WHETHER ADMITTED, DISCHARGED, etc. |
| STATUS | THE CONDITION OF THE PATIENT, e.g., CRITICAL, SERIOUS, etc. |
| WARD | THE HOSPITAL WARD ON WHICH THE EVENT OCCURRED. |
| ⋮ | ⋮ |

FIG. 12

ATTRIBUTE VALUES DATABASE – 1200

| ATTRIBUTE NAME | VALUE |
|---|---|
| EVENT TYPE | ADMITTED |
| EVENT TYPE | DISCHARGED |
| EVENT TYPE | STATUS CHANGED |
| STATUS | GOOD |
| STATUS | FAIR |
| STATUS | SERIOUS |
| STATUS | CRITICAL |
| WARD | EMERGENCY |
| WARD | INTENSIVE CARE |
| WARD | OBSTETRICS |
| WARD | PEDIATRICS |
| ⋮ | ⋮ |

FIG. 13

SUBSCRIBABLE OBJECTS DATABASE - 1300

| OBJECT NAME | OBJECT TYPE |
|---|---|
| J. ORDILLE | PATIENT |
| H. SLYE | PATIENT |
| P. TENDICK | PATIENT |
| DR. TANDON'S PATIENTS | PATIENT LIST |
| DR. WEISS' PATIENTS | PATIENT LIST |
| ⋮ | ⋮ |

FIG. 14

USER-OBJECT PRIVILEGES DATABASE - 1400

| USER OR ROLE | TARGET OBJECT | PRIVILEGE |
|---|---|---|
| WEISS | J. ORDILLE | SUBSCRIBE TO |
| WEISS | H. SLYE | SUBSCRIBE TO |
| NTANDON | J. ORDILLE | SUBSCRIBE TO |
| NTANDON | H. SLYE | SUBSCRIBE TO |
| NTANDON | P. TENDICK | SUBSCRIBE TO |
| WEISS | Q. YANG | SUBSCRIBE TO |
| NTANDON | DR. TANDON'S PATIENTS | SUBSCRIBE TO |
| WEISS | DR. WEISS' PATIENTS | SUBSCRIBE TO |
| ⋮ | ⋮ | ⋮ |

FIG. 15

ATTRIBUTE TEMPLATE DATABASE – 1500

| | COMPANY NAME | TOP CUSTOMER | SEVERITY | SELECTION ELEMENT ID (SEid) | SOURCE | FL # | LHN # | CITY | PROVINCE (STATE) | PN/ZIP | COUNTRY | PRODUCT | REGION |
|---|---|---|---|---|---|---|---|---|---|---|---|---|---|
| 1510 → | R | | O | O | O | | | O | O | O | O | O | O |
| | | R | O | O | O | | O | O | O | O | O | O | O |
| 1520 → | | | O | O | O | R | | | | | | O | |
| | | | O | O | O | | O | O | O | O | O | O | O |
| | | | O | O | O | | R | R | R | O | O | O | O |
| | | | O | O | O | | O | O | R | R | O | O | O |
| | | | R | O | O | | O | O | O | O | O | O | R |
| | | | O | R | O | | O | O | O | O | O | O | O |
| | | | O | O | O | | O | O | O | O | O | O | O |

FIG. 16

SUBSCRIPTION TABLE – 1600

| REQUIRED ATTRIBUTE NAME | REQUIRED ATTRIBUTE VALUE LIST |
|---|---|
| OPTIONAL ATTRIBUTE 1 NAME | OPTIONAL ATTRIBUTE 1 VALUE LIST |
| OPTIONAL ATTRIBUTE 2 NAME | OPTIONAL ATTRIBUTE 2 VALUE LIST |
| . . . | . . . |

FIG. 23

"I AM ON A CUSTOMER VISIT."

"I WILL DISPATCH A TECH TO THE SITE RIGHT AWAY."

2300

This request is still pending.
Responses:

| Responder | Date | Submit | Comments | Org | Phone | E-Mail |
|---|---|---|---|---|---|---|
| Joann Ordille | Wed Mar 12, 2003 7:51 AM EST | Yes | Recording | Field Services | +1 908 696-5125 | joann@avaya.com |
| Jerry Ryan | Wed Mar 12, 2003 8:58 AM EST | Watch | I will watch to see the resolution of this case | Sales | +1 908 953-5165 | gwryan@avaya.com |
| Qian Yang | Wed Mar 12, 2003 8:58 AM EST | No | Recording | NSM | +1 908 696-5179 | yangqian@avaya.com |

} 2310

Requests:
*This request was generated on Tue Mar 11, 2003 3:31 PM EST.*

| Customer Contact | | Case Manager Contact | |
|---|---|---|---|
| Name | JANE DOE | Name | JOHN AVAYA |
| Email | jane@c1.com | Email | john@avaya.com |
| Phone Number | 8005551212 | Phone Number | 8005551213 |
| Site Location | Company One Development Center (FL #:0005555555) | | |
| Site Address | 40 Company One Road, Townsville, NJ UNITED STATES | | |

| Request | |
|---|---|
| Maestro Case # | 123456 |
| FSAC Ticket # | SW5555555 |
| Subject | G3R Customer Request |
| Category | Company One Major Repair |
| Severity Code | 4 |
| Status | RefFSO |
| Date Reported | Wed Mar 12, 2003 7:37 AM EST |
| Description | Phones are down in the warehouse. Cust requests dpo. |
| Note | For a graphical display of alarm/ticket history, click here. |

} 2320

Will you take responsibility for this case?

⊙ Yes, I take responsibility for this.
○ No, I don't take responsibility for this case, but will follow its progress.
○ No, I don't take responsibility for this case.

} 2330

Previous | Next

Nina Tandon

© 2003 Avaya, Inc. All Rights Reserved.

FIG. 25

Registered Notification Profiles:
Profile "Routine" is added
1. 7x24 Profile (Custom)
   Initial Notification 1: My Pager (24x7), Work Phone (Business Hours), MailContact (24x7), Inbox (24x7)
   Reminder 1: After 4 hours, MailContact (24x7), Inbox (24x7)
   Reminder 2: After 1 day (counted during business hours), My Pager (24x7), Inbox (24x7)

[Modify] [Delete]

2. Alarm Setup Profile (Custom)
   Initial Notification 1: Delay 30 minutes, MailContact (24x7), Inbox (24x7)

[Modify] [Delete]

3. Routine Profile (Custom)
   Initial Notification 1: MailContact (24x7), Inbox (24x7)

[Modify] [Delete]

FIG. 26

Contact Profile: ● Custom

Initial Notification — 2610

Inbox, and: 24x7 delayed by: ☐ days, ☐ hours, ☐ minutes, counted during [24x7 ▼]

☐ Mail Contact — 24x7 ▼
☐ Work Phone — 24x7 ▼
☐ My Pager — 24x7 ▼

Reminder [Add] — 2620

Inbox, and: 24x7

● After ☐ days, ☐ hours, ☐ minutes, counted during [24x7 ▼]

☐ Mail Contact — 24x7 ▼
☐ Work Phone — 24x7 ▼
☐ My Pager — 24x7 ▼

[Save]  <<previous  next>>

| | | |
|---|---|---|
| 2720 | FL | Input here for validation [Validate or Search] 2710 (use semicolon to separate multiple values) |
| 2730 | Case Source | ☐ Customer Request<br>☐ Product Alarm |
| 2740 | Message Type | ☐ Case Completed<br>☐ Case Opened |
| 2750 | Product | Select from below (use CTRL key for multiple selections):<br>11A MILITARY<br>11A PUBLIC<br>1A2 KEY<br>2PRT CLASSIC MAIL VS<br>2PRT PARTNER MAIL<br>2PT MERLIN MAIL<br>3500 FAX<br>8434DX<br>9012 FAX |
| 2760 | Product Family | Select from below (use CTRL key for multiple selections):<br>AUDIX<br>CAJUN<br>CALL ACCOUNTING<br>CENTERVUE<br>CMS<br>COIN<br>COMKEY<br>CONVERSANT<br>COUNTRY |
| 2770 | Severity | ☐ Severity 1s<br>☐ Severity 2s<br>☐ Severity 3s<br>☐ Severity 4s<br>☐ TOOS |

2700

METHOD AND APPARATUS FOR A PUBLISH-SUBSCRIBE SYSTEM WITH THIRD PARTY SUBSCRIPTION DELIVERY

CROSS REFERENCE TO RELATED APPLICATIONS

This application claims the benefit of U.S. Provisional Application No. 60/554,232, filed Mar. 18, 2004, and is related to U.S. patent application Ser. No. 10/184,236, filed Jun. 26, 2002, entitled "Method and Apparatus for Automatic Notification and Response;" and U.S. patent application Ser. No. 10/184,325, filed Jun. 26, 2002, entitled "Method and Apparatus for Automatic Notification and Response Based on Communication Flow Expressions," each incorporated by reference herein.

FIELD OF THE INVENTION

The present invention relates generally to communication methods and systems, and more particularly, to methods and systems that notify one or more users of information.

BACKGROUND OF THE INVENTION

Several technologies are available to notify users of events or new information. Typically, these technologies are based on email lists, bulletin boards, publish-subscribe systems, database triggers and filtering systems. A core issue in all of these systems is how the message to be sent is matched with interested subscribers. Email distribution lists and bulletin boards, for example, provide a fixed taxonomy of topics of interest. People subscribe to receive notifications for one or more topics by joining the email list or the bulletin board on that topic.

Publish-subscribe systems are also often organized with fixed taxonomies of topics. These systems are sometimes called topic-based (or type-based) publish-subscribe systems in the literature. Another category of publish-subscribe system is called the content-based publish-subscribe system. In these systems, attribute-value pairs in the message published are matched against user-specified constraints that are conjunctions of relational expressions over some of the attribute-value pairs (for example, item=car and price<$10,000) or, more generally selection queries in a normal form such as conjunctive normal form (for example, ((item=car) or (item=motorcycle)) and (price<$10,000)).

While such publish-subscribe systems provide an effective mechanism for notifying users of events or new information, they suffer from a number of limitations which, if overcome could make such publish-subscribe systems better suited for enterprise applications. For example, while some fee-based publish-subscribe systems are motivated to ensure that only authorized users are notified, they do not contain access control mechanisms that protect the content of the notifications. A need therefore exists for improved methods and apparatus that make such publish-subscribe systems suitable for use by enterprise applications. A further need exists for publish-subscribe methods and systems that provide improved security. Yet another need exists for publish-subscribe methods and systems that provide improved efficiency for enterprise users.

SUMMARY OF THE INVENTION

Generally, methods and apparatus are provided for notifying one or more users of information. One or more users are identified that have entered a subscription that matches the information; and a communication flow expression is generated that contains at least one primitive keyword indicating how a notification to the identified users should be processed. The communication flow expression may be provided, for example, to a third party for delivery. Typically, a request identifier is received back from the third party and forwarded to the application associated with the information. The communication flow expression comprises at least one recipient for the notification.

According to another aspect of the invention, the identified users must have appropriate privileges associated with the information before being added to the communication flow expression. The appropriate privileges comprise, for example, a privilege to subscribe to an object associated with the information and a privilege to notify any subscribers and delegates associated with the notification.

A more complete understanding of the present invention, as well as further features and advantages of the present invention, will be obtained by reference to the following detailed description and drawings.

BRIEF DESCRIPTION OF THE DRAWINGS

FIG. 5 illustrates the types of privileges enforced by the subscription server of FIG. 3;

FIG. 6 is a sample table illustrating an exemplary user database;

FIG. 7 is a sample table illustrating an exemplary user roles database that shows role membership of the users and roles;

FIG. 8 is a sample table illustrating an exemplary privileges database that lists a number of the exemplary privileges supported by the subscription server;

FIG. 9 is a sample table illustrating an exemplary user privileges database that shows the privileges for users and roles;

FIG. 10 is a sample table illustrating an exemplary user-user privileges database that shows the privileges of users and roles that apply to another user or an application;

FIG. 11 is a sample table illustrating an exemplary attributes database that lists the attributes of the hospital application;

FIG. 12 is a sample table illustrating an exemplary attribute values database that lists some possible values for the attributes of FIG. 11;

FIG. 13 is a sample table illustrating an exemplary subscribable objects database for an exemplary hospital application;

FIG. 14 is a sample table illustrating an exemplary user-object privileges database that shows the privileges of users and roles that apply to subscribable objects;

FIG. 15 is a sample table illustrating an exemplary attribute template database incorporating features of the present invention;

FIG. 16 is a sample table illustrating an exemplary subscription table;

FIG. 23 illustrates an exemplary user interface that allows a user to review one or more pending requests;

FIG. 25 illustrates an exemplary user interface that allows users to view, update or delete their notification profiles;

FIG. 26 illustrates an exemplary user interface that allows users to enter a new notification profile;

FIG. 27 illustrates an exemplary user interface that allows a user to subscribe to notifications; and FIG, 28 illustrates an exemplary user interface that presents a list of subscriptions to the corresponding user.

DETAILED DESCRIPTION

Figure 1:
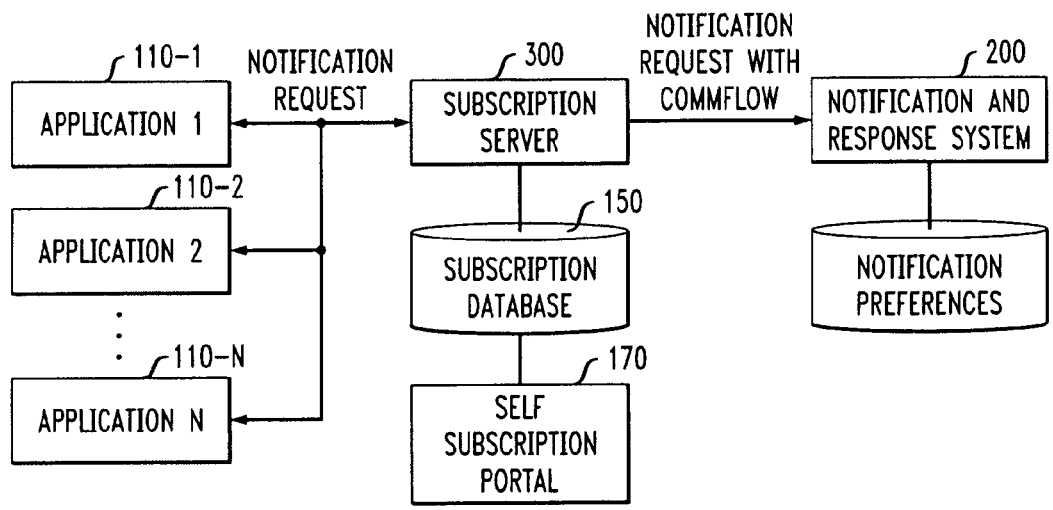
FIG. 1 illustrates a network environment in which the present invention can operate.

FIG. 1 illustrates a network environment 100 in which the present invention can operate. As shown in FIG. 1, one or more applications 110-1 through 110-N (hereinafter, collectively referred to as applications 110) provide notification requests to a subscription server 300, discussed below in conjunction with FIG. 3. As discussed hereinafter, the notification requests contain information that the applications 110 believe may be of interest to one or more users. According to one aspect of the invention, the subscribers have registered their interests with the subscription server 300 in the form of subscriptions recorded in a subscription database 150. In one exemplary implementation, the users provide their subscriptions to the subscription server 300 using a self subscription portal 170. The self subscription portal 170 enables users to create, modify, and delete subscriptions. Given the notification requests from the applications 110 and the subscriptions recorded in the subscription database 150, the subscription server 300 can perform a matching process to identify those users that should be notified of given information.

According to another aspect of the invention, the subscription server 300 employs subscribable objects that are specific things of potential interest to users. For example, using subscribable objects, applications 110 can specify information of interest based on, e.g., customers or customer locations. A user can subscribe to a subscribable object. For example, a user can subscribe to the subscribable object for a customer to be notified about service requests from that customer.

In addition, subscribable objects can have access controls applied to them, so, for example, the set of users who can subscribe to a specific customer can be restricted. Privileges specify what a user or role can do. Privileges can apply with respect to a specific person or object, or they can apply more generally. For example, an application may have the privilege to notify a specific user, or it may be able to notify any user. Privileges can include the ability of a person or role to subscribe to a subscribable object or to an application.

In this manner, the portal 170 can perform an initial access control when a user attempts to register a subscription to ensure that the user has the appropriate privileges required for the subscription. In addition, according to another aspect of the invention, the portal 170 ensures that a user only sees objects during the registration process that the user is authorized to view. In addition, the subscription server 300 can perform a secondary check at run time to ensure that the users associated with matching subscriptions are authorized to receive the notifications.

According to yet another aspect of the invention, the subscription server 300 identifies the users having subscriptions that match the notification requests and provides a list of the matching users to a third party application, such as a notification and response system 200, discussed below in conjunction with FIG. 2, that will actually notify the users. In one exemplary implementation, the subscription server 300 generates a communication flow ("commflow") expression for the request that specifies who to contact (i.e., those users having subscriptions that match the request), under what conditions to contact ("only if Ann said yes") and when to contact ("between 9 a.m. and 5 p.m. weekdays"). Recipients specify rules for refining communication flow expressions with details of how, i.e., which devices to use, and when to contact them. Recipients may also automatically delegate some requests to other recipients. The communication flow expression is provided to the notification and response system 200 with the notification request that includes the content for the notification.

Subscriptions provide a mechanism for specifying in advance the application-specific events about which a user will be notified. Subscriptions enable applications 110 to create notification requests without having to generate a communication flow or explicitly identify the users to notify. Instead, the subscription server 300 uses subscription information to preprocess the request, identifying the users to notify and generating a communication flow. After this preprocessing, the notification and response system 200 executes the communication flow. Furthermore, subscriptions provide an easy way for users to define the conditions under which they want to be notified (self subscription). Users can also define the conditions under which other users are to be notified (automatic subscription).

As discussed more fully below, a subscription may be created based on (i) subscribable objects that represent characteristics of a request to which a user can subscribe, e.g., a customer or customer location; (ii) zero or more attribute values that specify the values of request attributes that match a user's subscription; and (iii) optional rules that specify further conditions to be met for a request to match a user's subscription. A subscription could include any combination of mechanisms, e.g., a subscribable object and a rule. A rule could contain a condition, or it could refer to a general rule. A general rule contains a condition that can be reused in multiple subscriptions, and can be a subscribable object. Each subscription has an owner and a subscriber, and may also have a delegate. The owner is typically the creator of the subscription, while the subscriber is the primary user to be notified. The delegate is a second or alternate user to be notified, when specified. For a notification to match a subscription, it must match at least one subscribable object of the subscription. It also must match at least one value of each attribute specified on the subscription, and it must satisfy all of the subscription's rules.

Generally, the applications 110 provide notification requests to the subscription server 300 when they have information to publish (that may be of interest to one or more subscribers), in a manner described below in conjunction with FIG. 17. Thereafter, the subscription server 300 processes the notification requests and returns a status indication and request identifier to the associated application 110. The application 110 can use the request identifier, for example, to process, update, delete or evaluate the status of the request. In addition, if responses are received by the application 110, the request identifier can be used to associate the received responses to the request.

Figure 2:
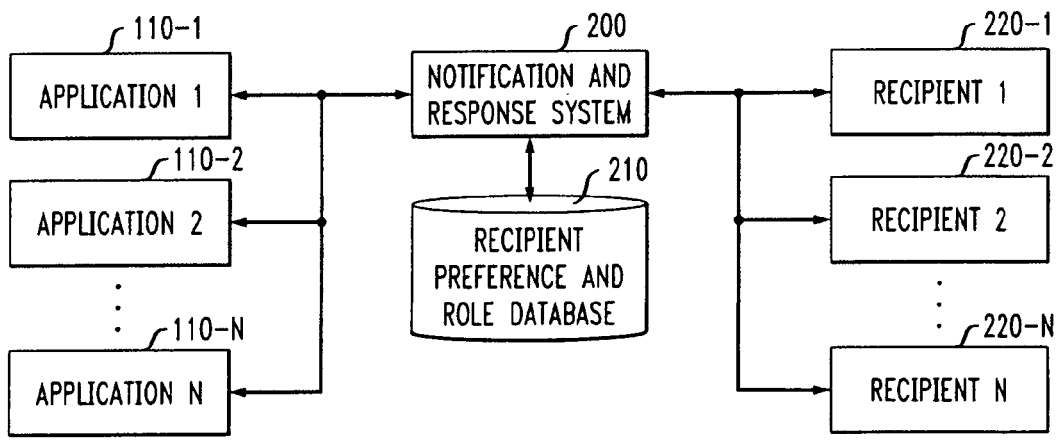
FIG. 2 illustrates an exemplary notification and response system of FIG. 1 in further detail.

FIG. 2 illustrates an exemplary notification and response system 200. The exemplary notification and response system 200 may be embodied, for example, as the Xui™ notification and response system, commercially available from Avaya, Inc. of Basking Ridge, N.J. and as described, for example, in U.S. patent application Ser. No. 10/184,236, filed Jun. 26, 2002, entitled "Method and Apparatus for Automatic Notification and Response;" and U.S. patent application Ser. No. 10/184,325, filed Jun. 26, 2002, entitled "Method and Apparatus for Automatic Notification and Response Based on Communication Flow Expressions," each incorporated by reference herein.

Generally, as shown in FIG. 2, the notification and response system 200 enables one or more applications 110-1 through 110-N to communicate with one or more recipients 220-1 through 220-N, hereinafter, collectively referred to as recipients 220, by a number of different media, such as electronic mail, telephone, web page, pager or facsimile. Generally, the notification and response system 100 (i) sends requests to one or more recipients 220, using the medium specified by each individual recipient 220 (and recorded for example, in a recipient preference and role database 210); (ii) collects and processes responses; and (iii) forwards the responses to their final destination by means of the medium specified by final destination. Roles provide a way of categorizing users and what they are allowed to do. The recipient preference and role database 210 also allows roles that are specified in a communication flow to be resolved to individual recipient names at the time the requests are transmitted.

The applications 110 create notification requests and submit them to the notification and response system 200. The notification requests must contain a communication flow to execute. Once the notification and response system 200 receives a notification request, the notification and response system 200 executes the communication flow logic to notify the recipients 220 and collect their responses. Generally, subscriptions specify criteria for deciding whether a user should be included in the communication flow for a request. A subscription belongs to a user and is specific to an application.

As discussed further below, the separation of the notification functionality provided by the notification and response system 200 from the subscription processing functionality provided by the subscription server 300, according to another aspect of the invention, allows the subscription server 300 to handle issues like scalability, security and access controls, and availability.

Figure 3:
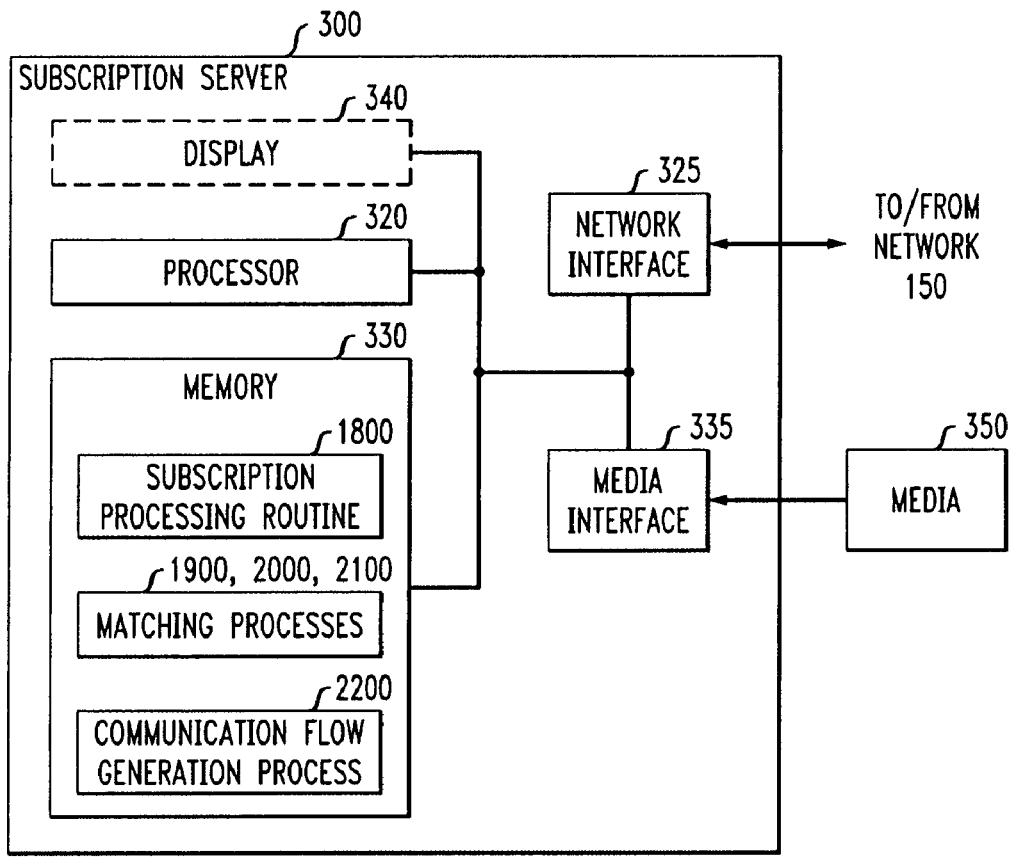
FIG. 3 is a schematic block diagram illustrating an exemplary implementation of the subscription server of FIG. 1 in further detail.

FIG. 3 is a schematic block diagram illustrating an exemplary implementation of the subscription server 300 of FIG. 1. As shown in FIG. 3, the subscription server 300 includes a computer system that interacts with media 350. The subscription server 300 comprises a processor 320, a network interface 325, a memory 330, an optional media interface 335 and an optional display 340. Network interface 325 allows the subscription server 300 to connect to a network, while media interface 335 allows the subscription server 300 to interact with media 350, such as a Digital Versatile Disk (DVD) or a hard drive. Optional video display 340 is any type of video display suitable for interacting with a human user of the subscription server 300. Generally, video display 340 is a computer monitor or other similar video display.

As discussed further below in conjunction with FIGS. 18 through 22, the memory 330 comprises a subscription processing routine 1800, matching processes 1900, 2000, 2100 and a communication flow generation process 2200. Generally, the subscription processing routine 1800 processes notification requests received from applications 110 and determines if they match any subscriptions, using one or more matching processes 1900, 2000, 2100. In addition, the communication flow generation process 2200 processes the matching subscriptions to generate communication flows that can be provided to a third party for delivery of the subscriptions. The communication flow generation process 2200 also ensures that the recipient of a notification has proper privileges.

In one exemplary implementation, the subscription server 300 provides an API that enables applications 110 to create notification requests that notify users according to their subscriptions. As discussed further below in conjunction with FIG. 17, to create a notification request, an application (subject to access controls) (i) creates a notification request; (ii) identifies subscribable objects, if any, associated with the requests, e.g., a customer, and (iii) identifies attributes of the notification.

Once a notification request has been created by an application 110 for subscription processing, the subscription server 300 processes the notification to identify users and generate a communication flow. Generally, as discussed further below in conjunction with FIGS. 18-21, the subscription server 300 (i) identifies those subscriptions that are associated with the application 110 and that also match at least one subscribable object of the request or else have no subscribable objects (i.e., if a subscription has any subscribable objects, at least one of them must match a subscribable object of the request; in addition, the owner of the subscription must have privileges to subscribe to at least one matching subscribable object); (ii) of the subscriptions that match based on subscribable objects or have no subscribable objects, the subscription server matches the attributes of the request to the attributes of the subscriptions (one value of each attribute of a subscription must match the value of the same attribute on the request); and (iii) evaluates the rules of the subscriptions, if any, based on the attributes of the request. All of the rules of a subscription must evaluate to true for a match. The subscriptions that match a request based on subscribable objects (or have no subscribable objects), and which also match based on attributes and rules, match the request and are selected for notification.

Once the subscriptions that match a request have been identified, the subscription server 300 employs a communication flow generation process 2200 (FIG. 22) to identify the subscriber and optionally the delegate for the subscription, and includes those users in the communication flow for that request (subject to the privileges of the subscription owner). Specifically, the owner of the subscription must have the privilege to subscribe to a matching subscribable object, and also to notify the subscriber and delegate (if any). Subscriptions that do not have sufficient privileges are not added to the communication flow. Instead, appropriate errors are logged. For example, the subscriber is often the subscription owner, in which case the subscriber can be notified in the communication flow. If, however, the subscriber or delegate is not the owner, then the owner must have sufficient privileges to notify those users, or else an error occurs. The privileges of the subscription are also checked by the self subscription portal when the subscription is created or modified.

It should be noted that for each attribute (e.g., ZIP Code), the notification request can have at most one value (e.g., 07920). However, for a single attribute, a subscription may have any number of values. Both notification requests and subscriptions can have any number of subscribable objects.

For a high volume of requests and a large number of subscriptions, computational efficiency will become an issue in matching notification requests to subscriptions. There are several ways that the matching could be done in practice:

1. First of all, the subscription server could maintain a conventional tree type index on the subscribable object associations of the subscriptions. The subscription server could use this index to match the request to those subscriptions with the same subscribable objects as the request. The subscription server could then further filter the subscriptions based on their attribute values and rules.

2. It may be that some subscriptions have no associated subscribable objects. In this case, the request need only match the attribute values and rules of the subscription, and the approach above will not work. Instead the subscription server could maintain a bitmap index on the attribute values of the subscriptions. The subscription server could use this index to match the request to those subscriptions with the same attribute values as the request. The subscription server could then further filter the subscriptions based on rules.

Figure 4:
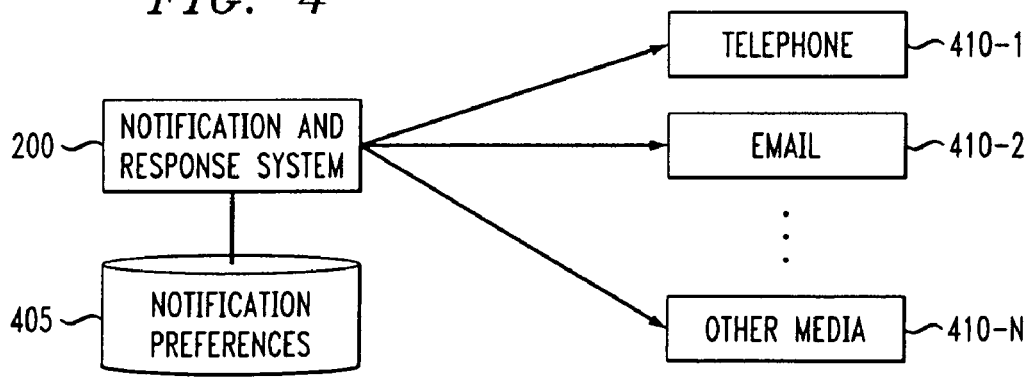
FIG. 4 illustrates the processing of notification and responses by the notification and response system in further detail.

FIG. 4 illustrates the processing of notification and responses by the notification and response system 200 in further detail. As shown in FIG. 4, the exemplary notification and response system 200 can send notifications to users using one or more media types 410, such as via telephone or email in an exemplary implementation, in accordance with user preferences recorded in a notification preferences database 405.

Subscription Security

Privileges

Privileges identify what a user can do in the subscription server 300. These privileges are subscription server specific, and are distinct from database or operating system privileges. As shown in FIG. 5 and discussed further below, the subscription server 300 will provide for several types of privileges, including (i) unary privileges, which apply to a user or role; (ii) user privileges, which describe what a user or role can do vis-à-vis another user or application; and (iii) subscribable object privileges, which enable a user or role to subscribe to an object.

Roles

A role is treated as a type of user in the subscription server 300, but is not a person or application. A role can have privileges. Users can have roles, and thereby inherit privileges from those roles. A role can also have other roles, and thereby inherit privileges from those roles. A role cannot initiate a session with the subscription server 300, and the subscription server 300 cannot perform an activity on behalf of a role. A user or role can be granted a user privilege vis-à-vis a role. A role can be specified as the recipient in a subscription or escalation.

Objects

The subscription server 300 will provide implicit or explicit access controls on the following subscription server objects: attributes; attribute values; requests; request attributes; rules; general rules; subscribable objects; and subscriptions. In other words, when performing an action involving these entities on the behalf of a user or application, the subscription server 300 will apply access controls on those objects.

Object Ownership

The subscription server 300 will determine object ownership based on the following principles. The owner of a request and its attributes is the requestor (application). The owner of subscriptions, subscribable objects, attributes, and general rules is the creator (which could be an application). The owner of an attribute value is the attribute owner.

Access Controls

Access controls identify what a user can do to an object. Access controls apply to subscribable objects, requests, and other objects. Explicit access controls comprise a ternary relationship between user accounts, objects, and privileges. Access controls can also be implicit through object ownership. Generally, the object owner has all applicable privileges on the object and the object owner can grant and revoke privileges on the object.

A community of interested parties could benefit tremendously from a process that enabled them to be notified only of the events of interest to them. Typically, a publish-subscribe model is used. However, the publish-subscribe paradigm is in direct conflict with another overriding need of many enterprises to preserve the confidentiality of the information being published.

For example, consider a hospital system that needs to notify health care workers about patient events. There are many such possible events, and they could be of interest to many different people. For example, a cardiologist might want to subscribe to events for patients under their care, or public health officials might want to subscribe to cases of a specific disease. And yet, the confidentiality of the information in the notifications is paramount. In addition, it is important to preserve the confidentiality of the patient's existence in the system. For example, the cardiologist might subscribe to the collection of all of her patients as a single entity, or she might subscribe only to specific patients. In the former case, the subscribable object is the collection of the cardiologists patients. In the latter case, the subscribable objects are the individual patients. In the latter case, only people with a need to know would be allowed to see that a patient was available for inclusion in subscriptions. For example, a patient's primary care physician might be able to see and subscribe to the patient, but would not be able to see or subscribe to other patients of the cardiologist, or see or subscribe to the cardiologist's patient collection object.

As discussed further below, confidentiality is preserved through a specific privilege to subscribe that can be applied to subscribable objects. The privilege to subscribe is different from the privilege to create, modify, or delete subscriptions.

In addition to choosing subscribable objects for subscriptions, the creator (owner) of a subscription has the ability to cause other users to be notified about events. Specifically, the owner or a subscription may make another user the subscriber (this is known as automatic subscription), or the owner may delegate a subscription to another user. For example, a supervisor might create subscriptions for his direct reports, or the cardiologist above might delegate her subscription to another physician while she is away on vacation. These capabilities are different from standard publish-subscribe models, since those models only allow users to create subscriptions for themselves.

Since the present invention allows others to be notified, the subscription services of the present invention provide access controls on the ability to notify other users. For example, without this capability, a disgruntled employee, who is about to be fired, could create a subscription for the CEO that causes thousands of notifications per hour to be sent. Instead, a supervisor might have the capability of notifying his direct reports, and the cardiologist might have the capability to notify all of the physicians affiliated with the hospital.

Working Example

The following example illustrates the workings of the subscription server 300 using a hospital notification system as an example. FIG. 6 is a sample table illustrating an exemplary user database 600. As shown in FIG. 6, the User Database 600 lists the users associated with the exemplary subscription services provided by the present invention for the subscription server 300 and portal 170 that host the hospital application. Users identify themselves through their logins, and some of the users (e.g., ham, joann, and yangqian) are actual human users. The user hosp_app is a user that represents the hospital application. Through this user account, the hospital application creates its subscribable objects, attributes, and attribute values, and also generates notification requests. The last four users in the User Database 600 (xui_user, xui_admin, hosp_user, hosp_admin) are actually roles. These roles may be assigned to human users, applications or other roles. All users, applications, and roles in the exemplary implementation are configurable; none are hard coded or assumed to exist by the system.

FIG. 7 is a sample table illustrating an exemplary user roles database 700 that shows role membership of the users and roles. In the exemplary table of FIG. 7, users ham and joann have the xui_admin role, which is for general administration of the subscription services. User yangqian has the xui_user role, which is a basic role that contains privileges common to all regular users. The hosp_user role is a role for users of the hospital application, and it has the xui_user role. The hosp_admin role is a role for hospital application administrators, and it has the hosp_user role.

FIG. 8 is a sample table illustrating an exemplary privileges database 800 that lists a number of the exemplary privileges supported by the subscription server 300. Some of those privileges shown in FIG. 8 are granted on a specific user or subscribable object. Specifically, the privileges "Create Subscription To Application" and "Subscribe To Objects Owned By" apply to a specific application, while the privilege "Notify" applies to a specific user.

Typically, regular users would get most or all of their privileges through roles, which greatly simplifies administration of privileges. A user or role may have more than one role. FIG. 9 is a sample table illustrating an exemplary user privileges database 900 that shows the privileges for the users and roles in the current example. The xui_admin role has very broad privileges (Create Any, Read Any, Update Any, Delete Any, Subscribe Any, Notify Any, Grant Any) that give administrators the power to modify the system as they wish. For example, an administrator may create user accounts, or delete or modify subscribable objects that belong to an application. Applications typically have more specific privileges. The hosp_app application has all create privileges except Create User, plus Notify Any. The hosp_app application does not require granted privileges to read, update, or delete objects it has created, since creation confers ownership and implicit privileges to read, update, or delete. The hosp_app application probably does not need the Notify Any privilege either, since it does not notify users directly. Instead, the owner of a subscription notifies the subscriber or delegate through the processing of a request by the subscription server. It is the owner of a matching subscription that needs privileges to notify.

FIG. 10 is a sample table illustrating an exemplary user-user privileges database 1000 that shows the privileges of users and roles that apply to another user or an application. For example, the hosp_user role has the Create Subscriptions To Application privilege with respect to the hosp_app application. This means that user ntandon (Dr. Tandon), who has the hosp_user role, may use the portal to create subscriptions for the hospital application. ("Hospital Application" will appear in the portal on the list of applications to which she can subscribe.) Also, the hosp_admin role has the privilege Subscribe To Objects Owned By with respect to the hosp_app application. This means that the user ptendick, who has the hosp_admin role, may subscribe to any subscribable object owned by the hospital application. Finally, the user ntandon (Dr. Tandon) has the Notify privilege with respect to the user weiss (Dr. Weiss), so Dr. Tandon may delegate her subscriptions to Dr. Weiss, or even create a subscription for which Dr. Weiss is the subscriber.

FIG. 11 is a sample table illustrating an exemplary attributes database 1100 that lists the attributes of the hospital application. Specifically, a notification request has an Event Type, a Status, and a Ward, among other attributes. FIG. 12 is a sample table illustrating an attribute values database 1200 that lists some possible values for the attributes of FIG. 11. For example, the attribute Status has values Good, Fair, Serious, and Critical.

The hospital application also has subscribable objects listed in the subscribable objects database 1300 of FIG. 13. Each subscribable object shown in FIG. 13 has a type, which could be Patient or Patient List. The Patient type includes individual patients, while the Patient List type includes patient lists for doctors and patient lists for clinical trials. For example, there are two Patient List objects, called Dr. Tandon's Patients and Dr. Weiss' Patients.

FIG. 14 is a sample table illustrating an exemplary user-object privileges database 1400 that shows the privileges of users and roles that apply to subscribable objects. Dr. Tandon's patients are P. Tendick, J. Ordille, and H. Slye, so she can subscribe to the subscribable objects for those patients, and also to the patient list "Dr. Tandon's Patients." (The subscribable objects for those patients are distinct entities from the user accounts for those same individuals. For this application, a patient need not be a user. It just happens that the patients in this example are also users.) Dr. Weiss is the primary care physician for J. Ordille, H. Slye, and Q. Yang, but not for P. Tendick, so he can subscribe to patients J. Ordille, H. Slye, and Q. Yang, and also to his own patient list. The reason for having subscribable objects for both patients and patient lists is to make the subscriptions simpler and easier to maintain. For example, Dr. Weiss need not change his Patient List subscriptions as his patient list changes.

Dr. Tandon, a cardiologist, enters the portal 170 to create a subscription, and sees that she can subscribe to the hospital application (hosp_app). This is because she has the hosp_user role, which has the privilege Subscribe to Application with respect to the hosp_app application. If she had the Subscribe Any privilege (either directly or through a role), she would see the entire list of applications. Dr. Tandon selects the hospital application, and finds she may subscribe by patient or by patient list. She decides to subscribe by patient list. Because there is a moderate number of Patient List subscribable objects (cardinality medium), the portal 170 retrieves the list of all Patient List type subscribable objects owned by hosp_app, then checks to see if ntandon has the Subscribe Any privilege. Since she does not, the portal 170 then filters the list on the set of subscribable objects to which user ntandon has the Subscribe To privilege. The portal 170 then displays the list, which contains only the item Dr. Tandon's Patients, on the subscription form. Dr. Tandon creates a subscription to Dr. Tandon's Patients, but only for Admitted and Discharged events types. Then, she decides that she also needs to subscribe by patient. She enters the form to subscribe by patient, and on the list of patients to which she can subscribe, she sees J. Ordille, H. Slye, and P. Tendick, but not Q. Yang. She creates a subscription to P. Tendick for an event type of Status Changed. Dr. Tandon (user ntandon) is both the owner and the subscriber for this subscription. There is no delegate at this point.

If there were a large number of Patient List subscribable objects (cardinality large), the portal 170 would provide the capability for the user to enter a partial string value, and the portal 170 would return a list of matching subscribable objects, e.g., containing the string 'Tendick'. If ntandon had the Subscribe Any privilege, the portal 170 would display the entire list of matching subscribable objects. Otherwise, before displaying the list, the portal 170 would then filter the list on the set of subscribable objects to which user ntandon had the Subscribe To privilege. Once the list of matching subscribable objects were displayed, the user could select zero or more to include in the subscription. The user also could enter the subscribable object names directly on the form. Through repeated use of these mechanisms, the user could enter multiple subscribable objects on the form. In any event, on submission of the subscription by the user, the portal 170 would check whether the subscribable object existed, and also whether the user had appropriate privileges to subscribe to the subscribable objects by the mechanisms described above. If a subscribable object on the subscription did not exist, or if the user did not have sufficient privileges to subscribe to an object on the subscription, the portal 170 would display an error and not allow the submission of the subscription.

Dr. Weiss enters the portal to create a subscription, and also finds that he may subscribe by patient or by patient list. He decides to subscribe by patient list, and sees only Dr. Weiss' Patients. He creates a subscription to Dr. Weiss' Patients, but only for Admitted events. If Dr. Weiss tried to subscribe by patient, he would see J. Ordille, H. Slye, and Q. Yang, but not P. Tendick. He could subscribe to one or more patients in a single subscription.

If patient P. Tendick's status were upgraded from serious to fair, the hospital application would create a notification request with the subscribable objects P. Tendick and Dr. Tandon's Patients, with an event type attribute value of Status Changed and a status attribute value of Fair. Dr. Tandon's subscription to "Status Changed" events for P. Tendick would match the new request, but before adding Dr. Tandon (user ntandon) to the communication flow for the request, the subscription server would check to make certain user ntandon had sufficient privileges to subscribe to the P. Tendick object. The subscription server also would check to make sure the owner of the subscription (ntandon) had sufficient privileges to notify the subscriber (also ntandon). In this case, the owner may notify the subscriber, since a user may always notify her self.

Now Dr. Tandon enters the portal 170 again, but this time she modifies the subscription to P. Tendick status changes so it is delegated to Dr. Weiss. She does this because she is going on vacation and wants to make sure someone is notified of changes in P. Tendick's status. She specifies the "and" communication flow operator, so both she and Dr. Weiss will be notified. Before allowing Dr. Tandon to submit the delegation, however, the subscription portal 170 checks to make sure Dr. Tandon has sufficient privileges to notify Dr. Weiss.

Since user ntandon has the Notify privilege with respect to user weiss, the portal allows Dr. Tandon to submit the delegation.

If patient P. Tendick's status were upgraded from fair to good, the hospital application would create a notification request with the subscribable objects P. Tendick and Dr. Tandon's Patients, with an event type attribute value of "Status Changed" and a status attribute value of Good. Dr. Tandon's subscription to status change events for P. Tendick would again match the new request, but before adding Dr. Tandon and Dr. Weiss to the commflow for the request, the subscription server would check to make certain that user ntandon had sufficient privileges to subscribe to the P. Tendick object. Note that the subscription server only does this for the owner of the subscription, not the subscriber or delegate. The fact that Dr. Weiss does not have sufficient privileges to subscribe to patient P. Tendick is not relevant. The subscription server also checks to make sure the owner of the subscription (ntandon) has sufficient privileges to notify the subscriber and the delegate. As before, Dr. Tandon may notify herself, and she also may notify Dr. Weiss because she has a specific privilege to do so.

The reason for checking privileges when a request is processed by the subscription server is twofold: First of all, the subscription portal 170 is a separate process from the subscription server 300 and should not be trusted by it. In other words, the subscription server 300 must assume that the subscription portal 170 could allow the creation of a subscription with insufficient privileges. Second, privileges might change over time. For example, if patient P. Tendick left Dr. Tandon's care, Dr. Tandon might lose privileges to subscribe to P. Tendick's events, while Dr. Tandon's subscription might continue to exist. Similarly, Dr. Weiss might move to another practice, somehow causing Dr. Tandon to lose her privilege to notify him.

Subscription Portal 170

After a user logs in to the subscription portal 170, the portal 170 presents a list of applications that the user has access to. The list of applications is obtained from the subscription server 300 and is based on the privilege rules defined in the subscription server 300 (and previously provided by the application). The privilege rule states that a particular user can subscribe to messages from this application 110.

In addition to the privilege rules, an application must provide a set of attributes as a classification attribute set, that is, a complete list of attributes that can be used to classify information, and users can use these attributes to register their subscriptions. The attributes in the classification set may or may not be part of the data that will be presented to the users. According to one aspect of the invention, an application can specify some of the attributes or attribute sets to be required, in order to limit the amount of data transferred from the application database to the subscription server 300. In other words, when subscribers input rules for their subscriptions, the presence of one of the required attributes or attribute sets is mandatory. For each of those required attributes or attributes sets, a list of optional attributes can be provided, as discussed below in conjunction with FIG. 15.

Another aspect of the invention recognizes that different users or sets of users may have a different view of the data. Thus, different users or sets of users (such as all users having a given role) can select a different required attribute when registering their subscriptions. Thus, the present invention provides a number of different templates that each specify a different required attribute (or set of required attributes) and zero or more corresponding optional attributes. In this manner, different users or sets of users can select a different attribute for their required attribute. For example, in an enterprise setting one group of users, such as users in a customer service organization, may be interested in registering their subscriptions by Company Name, while another group of users, such as users in a on-site technical support organization, may be interested in registering their subscriptions by Company Location.

FIG. 15 is a sample table illustrating an exemplary attribute template database 1500 incorporating features of the present invention. As shown in FIG. 15, each row in the attribute template database 1500 corresponds to a different template that defines how users can register their subscriptions, where "FL#" indicates a field location number that identifies a customer location and "LHN#" indicates a legal hierarchy node that identifies an organization entity of a customer (such as a holding company, subsidiary or division). Each column in the attribute template database 1500 corresponds to a different exemplary attribute that an application has defined for classification. Each template in the attribute template database 1500 identifies a different attribute that can be employed as a required attribute (R). For each template, the attribute template database 1500 identifies the corresponding attributes that can be used as optional attributes (O) for the template.

For example, row 1510 indicates that the company name is a required attribute. When this required attribute is supplied, values for the optional attributes, severity, SEid, source, city, Province/state, Pn/Zip, country, product and region can also be supplied. Another example, row 1520 indicates that the combination of city and province/state is required in this case.

For the classification attributes, a list of valid values can be provided by the application. For example, severity codes can be from 1 to 4. But for some attributes, users need to input possible values when they subscribe. Applications must provide some mechanism to validate these values.

Again, after a user logs in to the subscription portal 170, the portal 170 presents a list of applications that the user has access to. Next to the application name is a list of the required attributes, which are links to different tables that are generated dynamically according to the data in attribute_map table in the subscription server 300, such as the subscription table 1600 shown in FIG. 16. Generally, the first row in the exemplary table 1600 identifies the required attribute. All the optional attributes, related to that required attribute, are listed underneath it. So the users can specify what type of notifications they want to receive, such as a required Company attribute with value Company A, and further specify details about the additional requirements that the notification has to meet, such as only high severity cases, or only cases in the United States.

In one exemplary implementation, when a user first logs in, the subscription portal 170 automatically creates a user account for the user in the subscription server 300. Also, a default role can optionally be assigned to this user to satisfy the basic needs of the user with reduced administration efforts. For example, if the default role can satisfy 70% of the users, then 70% of the administration efforts on assigning special roles can be saved.

Required attributes can be either subscribable objects or normal attributes. The benefits for defining subscribable objects is that a privilege rule can be associated with a subscribable object and that it will optimize the filtering process in the subscription server. However, for users, it is totally transparent for those two types of required attributes.

The format of every attribute in the subscription form available to the user, that is either a checkbox, list or search box, is defined by the cardinality table. By specifying the size of the attribute value group in the cardinality table, time is saved, and the trouble of counting the number of entries in the attribute table is avoided. The optimization is critical for some larger applications, and increases the scalability of the subscription server 300 and portal 170 and makes the portal 170 more user-friendly. An interface 2700 that presents the attributes based on the cardinality table is discussed further below in conjunction with FIG. 27.

Processes

In the following discussion, it is assumed that a subscription has an owner, a subscriber, and possibly a delegate. The owner and the subscriber are typically the same. If they aren't the same, this is called automatic subscription. For a subscription to be added to the communication flow for a request, the owner must have privileges to notify the subscriber and the delegate (if any). Someone may always notify themselves, so if the subscriber is the owner, then the owner has sufficient privileges to notify the subscriber. If the subscriber is not the owner, the owner may also have the blanket privilege to notify anyone, or the privilege to notify the specific subscriber or delegate. For subscription with a delegate, the delegate is notified in addition to or instead of the subscriber.

Figure 17:
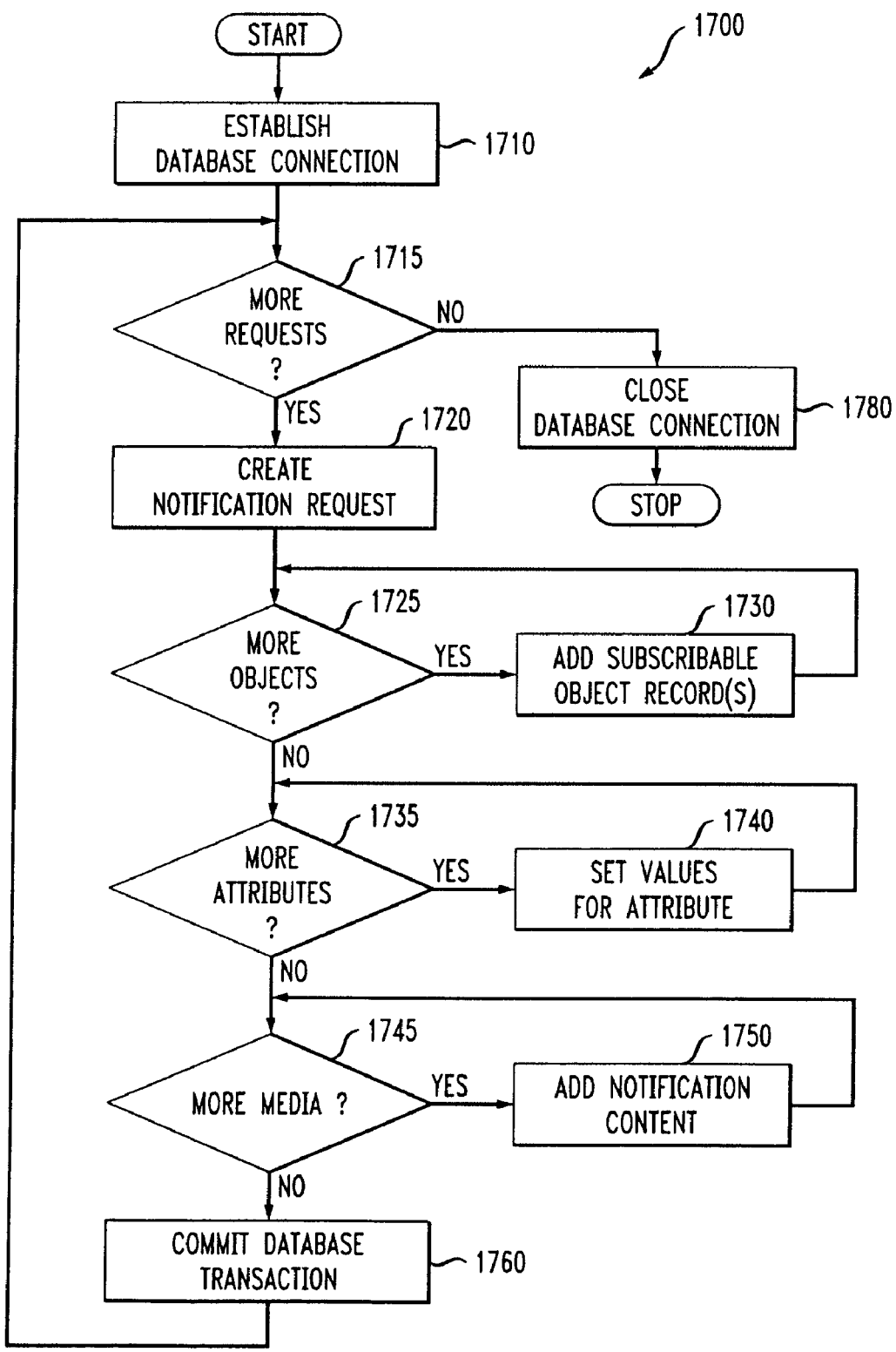
FIG. 17 is a flow chart describing an exemplary implementation of a request creation process, implemented by one or more applications to create notification requests.

FIG. 17 is a flow chart describing an exemplary implementation of a request creation process 1700, implemented by one or more applications 110 to create notification requests. As shown in FIG. 17, the request creation process 1700 initially establishes a database connection during step 1710 to log the necessary notification requests. Thereafter, a test is performed during step 1715 to determine if there are additional requests to be processed. If it is determined during step 1715 that there are additional requests to be processed, then a notification request is created during step 1720.

A further test is performed during step 1725 to determine if there are additional subscribable objects to be processed. If it is determined during step 1725 that there are additional objects to be processed, then one or more subscribable object records are created during step 1730, until all the objects have been processed. Once it is determined during step 1725 that there are no additional objects to be processed, then program control proceeds to step 1735.

A further test is performed during step 1735 to determine if there are additional attributes within the request to be processed. If it is determined during step 1735 that there are additional attributes to be processed, then the values for the attributes are set during step 1740, until all the attributes have been processed. Once it is determined during step 1735 that there are no additional attributes to be processed, then program control proceeds to step 1745.

A further test is performed during step 1745 to determine if there are additional media, such as text and voice, to be processed. If it is determined during step 1745 that there are additional media to be processed, then the notification content for the media is added during step 1750, until all the media types have been processed. Once it is determined during step 1745 that there are no additional media types to be processed, then the database transaction is committed during step 1760 and program control returns to step 1715.

Once it is determined during step 1715 that there are no additional requests to be processed, then program control proceeds to step 1780 where the database connection is closed.

Figure 18:
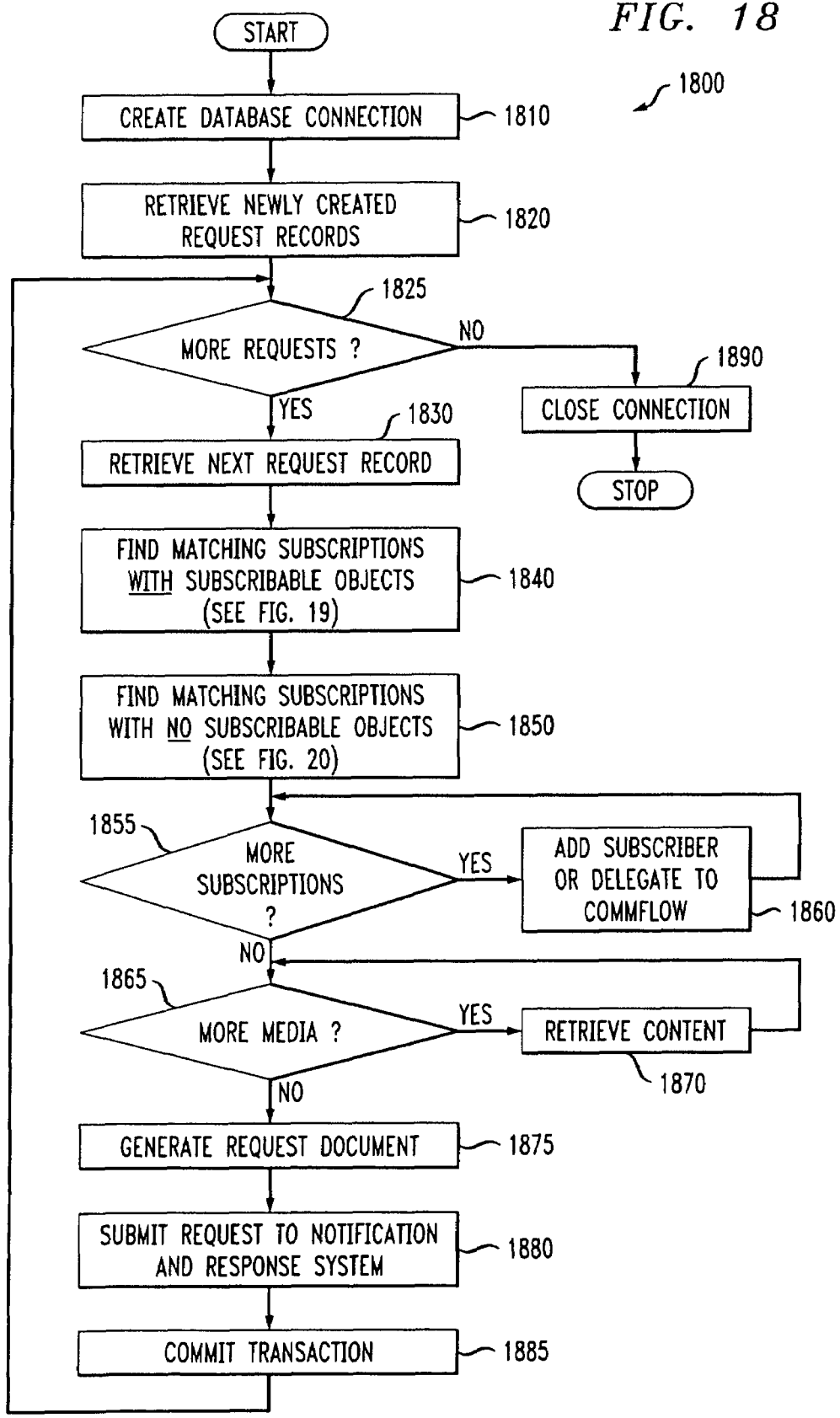
FIG. 18 is a flow chart describing an exemplary implementation of a subscription processing routine, implemented by the subscription server of FIG. 3.

FIG. 18 is a flow chart describing an exemplary implementation of a subscription processing routine 1800, implemented by the subscription server 300 of FIG. 3. As shown in FIG. 18, the subscription processing routine 1800 initially creates a database connection during step 1810 and retrieves the newly created request records during step 1820.

A test is performed during step 1825 to determine if there are additional requests to be processed. If it is determined during step 1825 that there are additional requests to be processed, then the next request record is retrieved during step 1830.

As discussed further below in conjunction with FIG. 19, a matching process 1900 is executed during step 1840 to identify those subscriptions with subscribable objects. As discussed further below in conjunction with FIG. 20, a matching process 2000 is executed during step 1850 to identify those subscriptions with no subscribable objects.

A test is performed during step 1855 to determine if there are additional subscriptions to be processed. If it is determined during step 1855 that there are additional subscriptions to be processed, then the subscriber or delegate is added to the communication flow being generated during step 1860, until all subscriptions have been processed. Once it is determined during step 1855 that all subscriptions have been processed, program flow proceeds to step 1865.

A further test is performed during step 1865 to determine if there are additional media, such as text and voice, to be processed. If it is determined during step 1865 that there are additional media to be processed, then the notification content for the media is added during step 1870, until all the media types have been processed. Once it is determined during step 1865 that there are no additional media types to be processed, then a request document is generated during step 1875. The request is then submitted to the notification and response system 200 during step 1880 and the transaction is committed during step 1885. Once it is determined during step 1825 that there are no additional requests to be processed, then the database connection is closed during step 1890.

Figure 19:
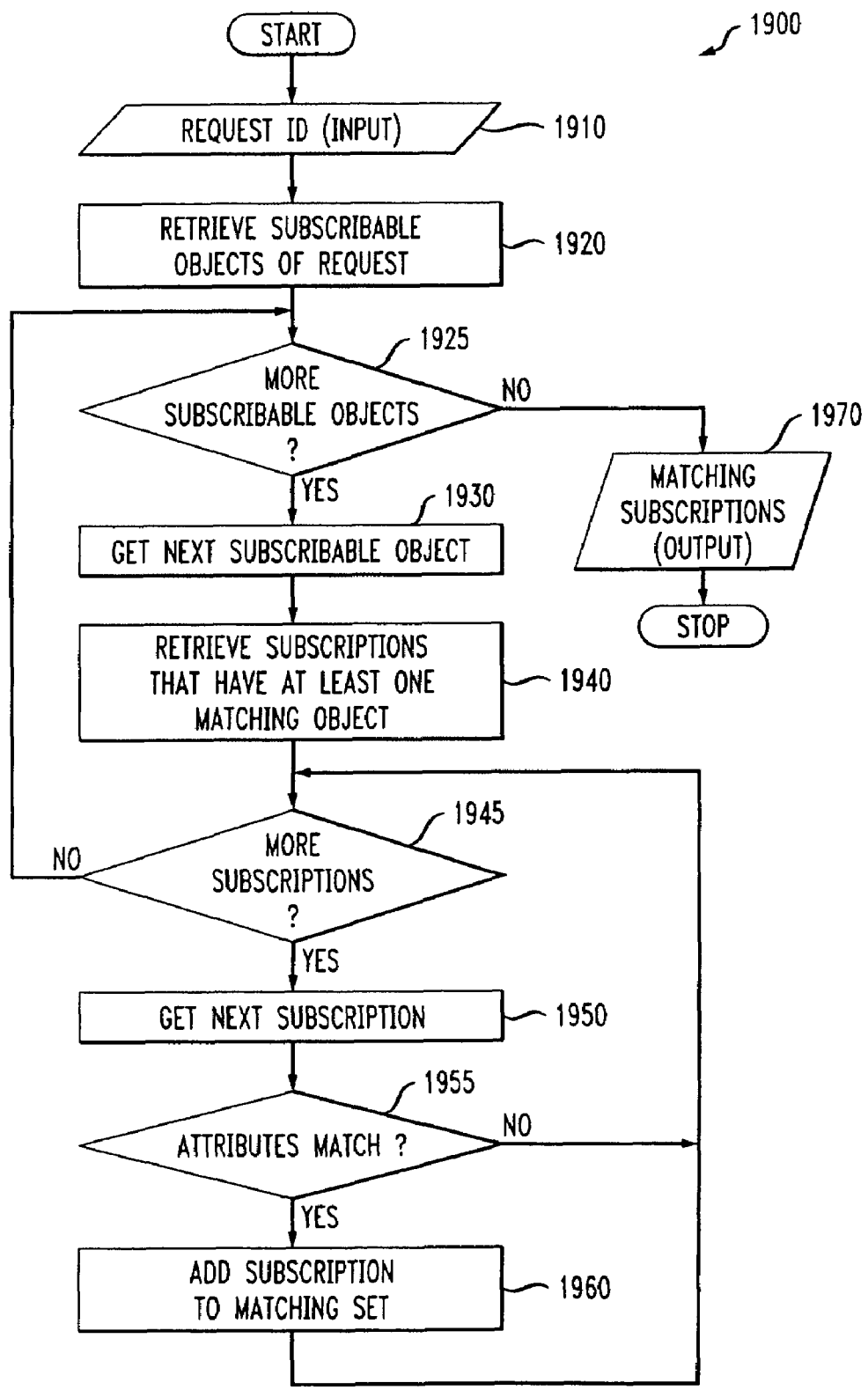
FIG. 19 is a flow chart describing an exemplary implementation of a matching process that identifies those subscriptions with subscribable objects.

FIG. 19 is a flow chart describing an exemplary implementation of a matching process 1900 that identifies those subscriptions with subscribable objects. As indicated above, the matching process 1900 is invoked by the subscription processing routine 1800 during step 1840. As shown in FIG. 19, the matching process 1900 initially receives a request identifier during step 1910 as input from the calling subscription processing routine 1800. The identifier is used during step 1920 to retrieve the subscribable objects associated with the request.

A test is performed during step 1925 to determine if there are additional subscribable objects to process. If it is determined during step 1925 that there are additional subscribable objects to process, then the next subscribable object is obtained during step 1930. The subscriptions that have at least one matching object are then retrieved during step 1940.

A further test is performed during step 1945 to determine if there are additional subscriptions to process. If it is determined during step 1945 that there are additional subscriptions to process, then the next subscription is obtained during step 1950. A test is performed during step 1955 to determine if any attributes of the subscription matches. It is noted that the attribute value for a request must match one specified attribute for a subscription, if the value is specified in the subscription. The subscription is added during step 1960 to the matching set and program control returns to step 1945.

Once it is determined during step 1945 that there are no additional subscriptions to process, then program control returns to step 1925. Once it is determined during step 1925 that there are no additional subscribable objects to process, then the matching subscriptions are output during step 1970.

Figure 20:
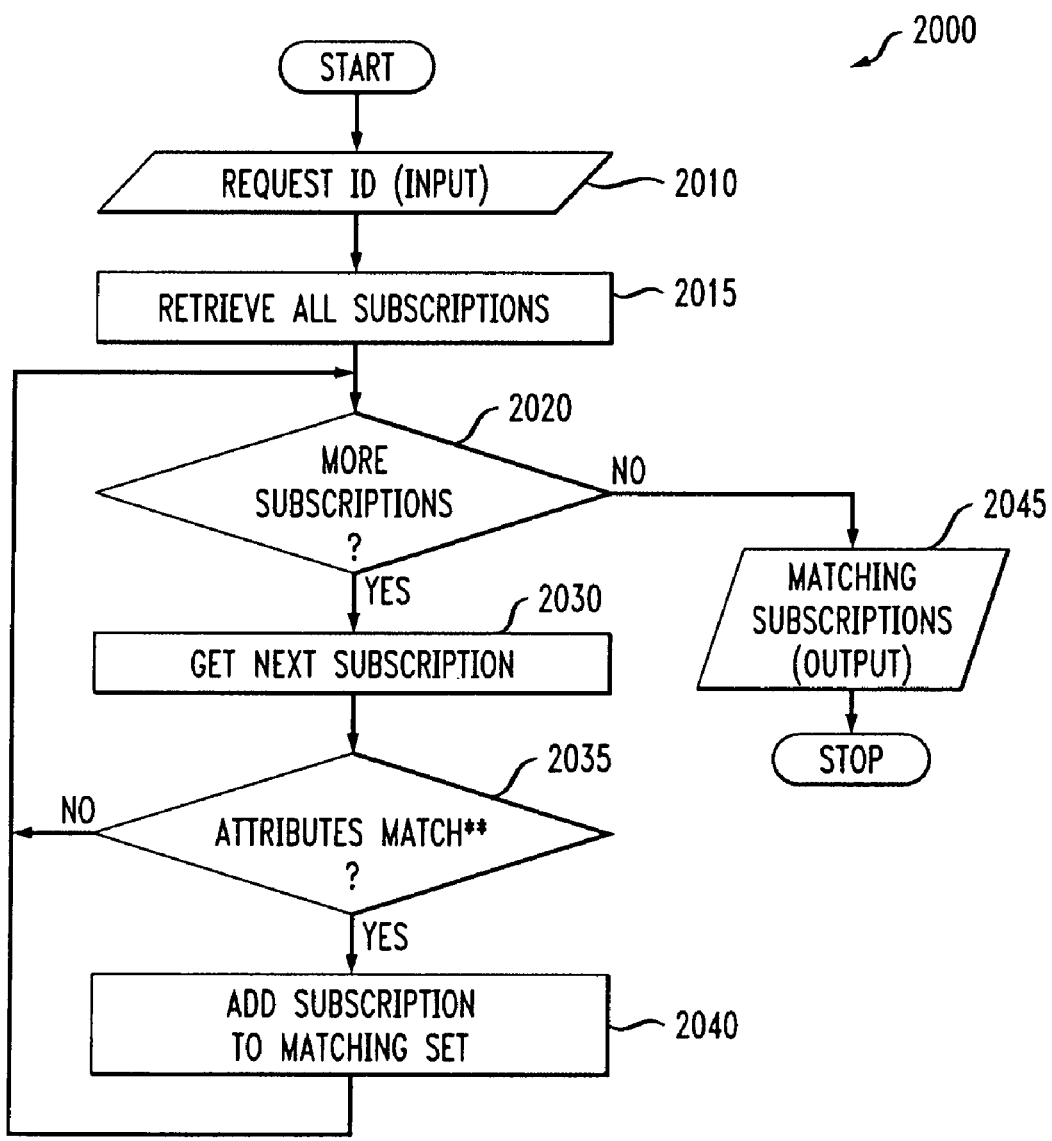
FIG. 20 is a flow chart describing an exemplary implementation of a matching process that employs a first approach to identify those subscriptions with no subscribable objects.

FIG. 20 is a flow chart describing an exemplary implementation of a matching process 2000 that employs a first approach to identify those subscriptions with no subscribable objects. As indicated above, the matching process 2000 is invoked by the subscription processing routine 1800 during step 1850. As shown in FIG. 20, the matching process 2000 initially receives a request identifier during step 2010 as input from the calling subscription processing routine 1800. All subscriptions are retrieved during step 2015.

A test is performed during step 2020 to determine if there are additional subscriptions to process. If it is determined during step 2020 that there are additional subscriptions to process, then the next subscriptions is obtained during step 2030. A test is performed during step 2035 to determine if any attributes of the subscription matches. It is noted that the attribute value for a request must match one of the specified values for an attribute for a subscription, if the value is specified in the subscription. The subscription is added during step 2040 to the matching set and program control returns to step 2020.

Once it is determined during step 2020 that there are no additional subscriptions to process, then the matching subscriptions are output during step 2045.

Figure 21:
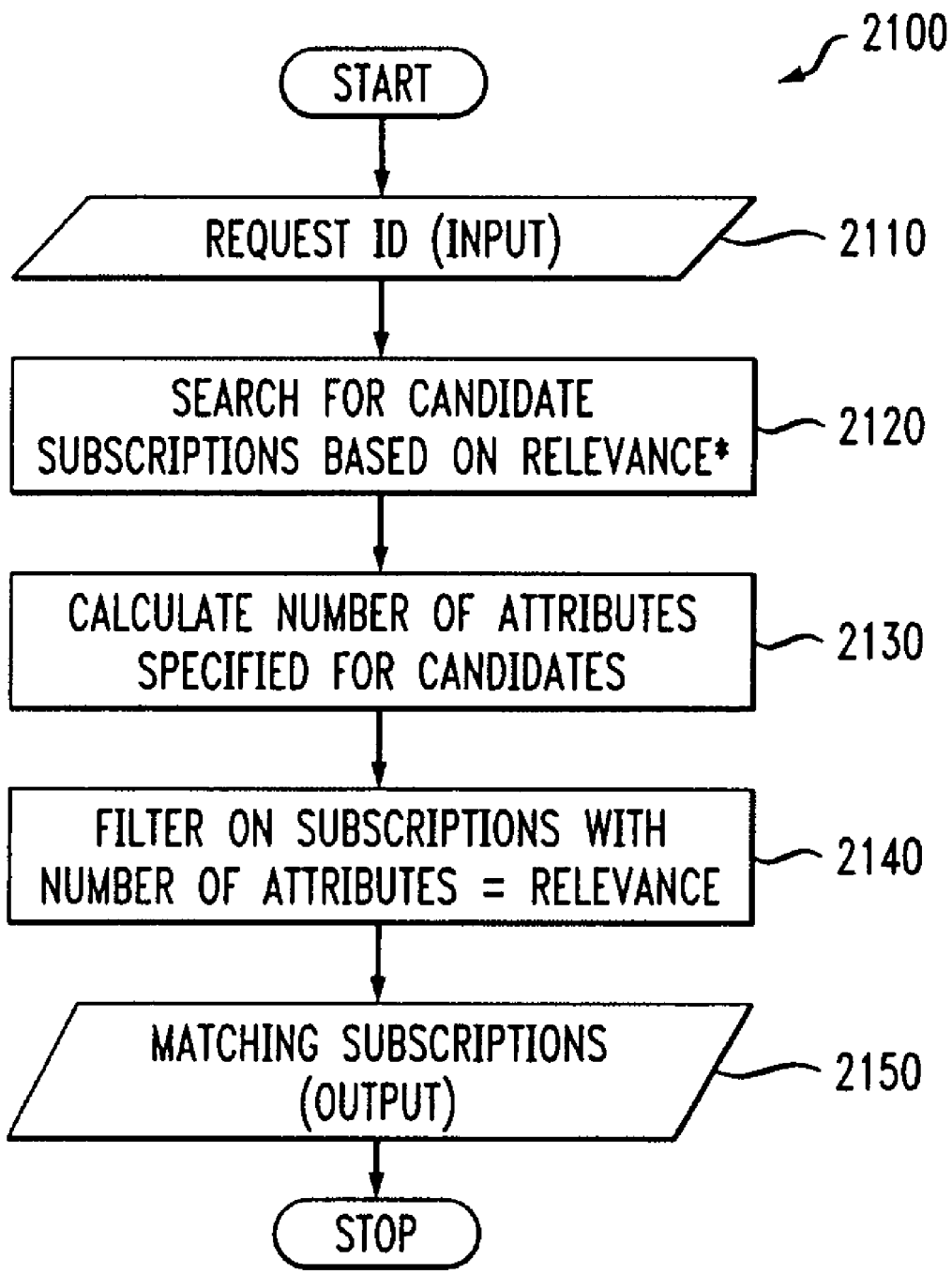
FIG. 21 is a flow chart describing an exemplary implementation of a matching process that employs a second approach to identify those subscriptions with no subscribable objects.

FIG. 21 is a flow chart describing an exemplary implementation of a matching process 2100 that employs a second approach to identify those subscriptions with no subscribable objects. As indicated above, the matching process 2100 is optionally invoked by the subscription processing routine 1800 during step 1850. As shown in FIG. 21, the matching process 2100 initially receives a request identifier during step 2110 as input from the calling subscription processing routine 1800.

A search for candidate subscriptions is performed during step 2120, based on relevance (where relevance is, for example, the number of attribute value matches). The number of attributes specified for the candidates is calculated during step 2130, a filter is applied to the subscriptions during step 2140 with the number of attributes equal to the relevance measure. The matching subscriptions are output during step 2150.

In the following discussion, it is assumed that the communication flow for a request (as generated by the communication flow generation process 2200) consists of zero or more subexpressions conjoined by the operator AND. Each subexpression corresponds to a matching subscription, and contains one or two recipients (the subscriber and/or the delegate). The notification and response system 200 evaluates the communication flow by attempting to satisfy each subexpression. There are three possible delegation options:

NOT—Notify the delegate instead of the subscriber
AND—Notify the delegate and the subscriber
RACES—Attempt to notify both the delegate and the subscriber until one of them responds For example, the communication flow for a request having four matching subscriptions may be expressed as:

(kevin) AND (dave) AND (ham RACES joann) AND (pat AND qian)

where kevin is a subscriber without a delegate, dave is delegate with NOT (notify the delegate instead of the subscriber); the third expression is an example of a delegation with RACES; and the fourth expression is an example of a delegation with AND.

Figure 22:
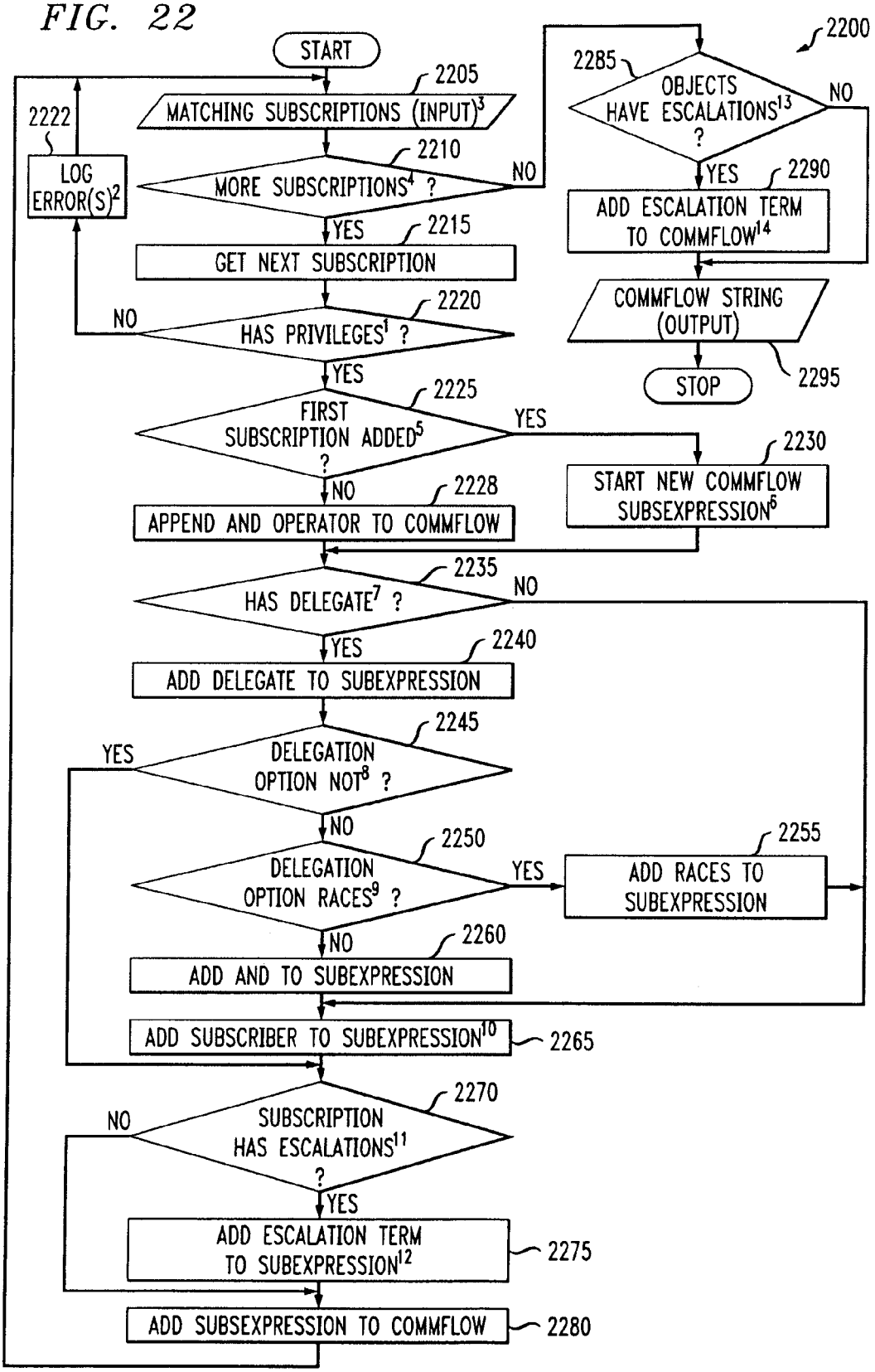
FIG. 22 is a flow chart describing an exemplary implementation of a communication flow generation process implemented by the subscription server of FIG. 3.

FIG. 22 is a flow chart describing an exemplary implementation of a communication flow generation process 2200 implemented by the subscription server 300 of FIG. 3. As shown in FIG. 22, the communication flow generation process 2200 initially receives a set of matching subscriptions as input during step 2205. A test is performed during step 2210 to determine if there are additional subscriptions to be processed. The system processes the subscriptions in the list sequentially, adding a communication flow subexpression for each subscription, until there are no more subscriptions to process. Each communication flow subexpression is typically enclosed in parentheses. If it is determined during step 2210 that there are additional subscriptions to be processed, then the next subscription is obtained during step 2215.

A further test is performed during step 2220 to determine if the user associated with the subscription has the appropriate privileges. Generally, the owner of subscription must have privileges to subscribe to an object on the request and to notify the subscriber and delegate. If it is determined during step 2220 that user associated with the subscription does not have the appropriate privileges, then an error is logged during step 2222. Each type of error (no object privilege, no notify privilege) can be logged separately for each subscription.

If it is determined during step 2220 that user associated with the subscription has the appropriate privileges, then a further test is performed during step 2225 to determine if the current subscription is the first subscription being added to the communication flow. The exemplary system conjoins the communication flow subexpressions for the subscription using the AND operator, so the AND operator must be appended to the commflow before adding subsequent terms.

If it is determined during step 2225 that the current subscription is the first subscription being added to the communication flow, then a new communication flow subexpression is started during step 2230. Each subexpression can have a term for the subscriber or a term for the delegate, or both. At this step, only the opening (left) parenthesis is provided. If, however, it is determined during step 2225 that the current subscription is not the first subscription being added to the communication flow, then the AND operator followed by an opening (left) parenthesis is appended to the communication flow during step 2228.

A further test is performed during step 2235 to determine if the user associated with the subscription has a delegate. This decision indicates whether to add the delegate term to the subexpression for the subscription. If it is determined during step 2235 that the user associated with the subscription has a delegate, then the delegate is added to the subexpression during step 2240. Another test is performed during step 2245 to determine if the delegation is expressed using the NOT option (notify the delegate instead of the subscriber). This decision thus indicates whether to substitute the delegate for the subscriber (skip adding a term for the subscriber), or include both. If it is determined during step 2245 that the delegation is expressed using the NOT option, then the closing (right) parenthesis is appended to the communication flow and program control proceeds to step 2270, below. If however, it is determined during step 2245 that the delegation is not expressed using the NOT option, then another test is performed during step 2250 to determine if the delegation is expressed using the RACES option (attempt to notify both the delegate and the subscriber until one of them responds). This decision thus indicates whether to use the RACES operator (attempt to notify both the delegate and the subscriber until one of them responds) or the AND operator (attempt to notify each regardless of how the other responds).

If it is determined during step 2250 that the delegation is expressed using the RACES option, then RACES is added to the subexpression during step 2255. If, however, it is determined during step 2250 that the delegation is not expressed using the RACES option, then AND is added to the subexpression during step 2260 before proceeding to step 2265. If it was determined during step 2235 that the user associated with the subscription does not have a delegate, then the subscriber is added to the subexpression during step 2265. At this point, the closing (right) parenthesis of the subexpression is added to the subexpression.

A further test is performed during step 2270 to determine if the subscription contains one or more escalations. Escalations for subscriptions can be retrieved from another table. An escalation for a subscription causes the user associated with the escalation to be notified if neither the subscriber nor the delegate (if applicable) responds. The subscription server 300 also optionally provides the ability to register to receive escalations. Escalations are different from subscriptions in that while subscriptions specify the features of a request that make it of interest, escalations describe ways of dealing with exceptional circumstances. In other words, escalations provide a way of handling things about which someone should be notified, but for some reason no one is. Escalations aren't subscriptions, but they can be something you can subscribe to. An escalation could be based on the failure of notification of the subscriber in a subscription (in which case the escalation relates to a specific person), or it could be based on the failure to notify anyone for a request.

If it is determined during step 2270 that the subscription contains one or more escalations, then the escalation term is added to the subexpression during step 2275. The escalation term contains one term for each escalation record, with the delay for the individual escalation represented by the AFTER operator. The individual escalation terms are conjoined by the AND or RACES operator within the overall escalation term, which is enclosed in parentheses. The overall escalation term for all subscription escalations is conjoined with the existing subexpression using the AND or RACES operator. The entire subexpression for the subscription, including the escalation term, is then enclosed in parentheses and appended to the commflow for the request.

If it is determined during step 2270 that the subscription does not contain one or more escalations, then program control proceeds directly to step 2280, where the subexpression is added to the communication flow.

Once it is determined during step 2210 that there are no additional subscriptions to be processed, then a further test is performed during step 2285 to determine if the subscribable objects have escalations. Escalations for the subscribable objects of the request can be retrieved from another table. An escalation for a subscribable object causes the user associated with the escalation to be notified if no one responds to a notification request with that object. If it is determined during step 2285 that the subscribable objects have escalations, then the escalation term is added to the communication flow during step 2290. The escalation term contains one term for each escalation record for each subscribable object on the request, with the delay for the individual escalation represented by the AFTER operator. The individual escalation terms are conjoined by the AND or RACES operator within the overall escalation term, which is enclosed in parentheses. The overall escalation term for all subscribable object escalations is conjoined with the existing commflow using the AND or RACES operator. Finally, the communication flow string is output during step 2295.

Third Party Subscription Delivery

As previously indicated, the subscription server 300 optionally provides the communication flows generated by the communication flow generation process 2200 to a third party, such as the notification and response system 200, for delivery to end users. As previously indicated, the application 110 sends a request proposal to the subscription server 300 that includes the Notification and Response System Request to be made, specified in XML or another appropriate specification language such as the Web Services Description Language (WSDL).

The XML for the Notification and Response System Request includes a line with a special string that marks where the communication flow needs to be inserted, as follows:

<target>%%COMMUNICATION_FLOW%%</target>

The <target> element is used to specify the communication flow in the Request XML specification and the subscription server 300 replaces the string "%%COMMUNICATION_FLOW%%" with a generated communication flow expression.

As long as the special string to be replaced is unique in all specifications, it is not even necessary for the subscription server 300 to know that the field for the insertion is <target> or that the request specification is in XML. This technique works for the specification of any downstream service.

Exemplary Communication Flows for Escalation

To escalate for a single person not responding, say joann not responding, the communication flow would be expressed as:

joann races dave after +04:00

Thus, if joann doesn't answer in within 4 hours, dave is also contacted. A response from one of them completes the entire communication flow. Similarly, to escalate on a delegation, the communication flows would be expressed as:

:Full delegation of joann to ham becomes:
ham races dave after +04:00
Shared delegation of joann to joann, ham becomes:
(joann races ham) races dave after +04:00
Parallel delegation of joann to joann, ham becomes:
(joann and ham) races dave after +04:00

In the last case, joann and ham must both respond before the four hours have passed to prevent the escalation. This last case assumes commflows in accordance with Version 2.5 of the Xui™ system and that users can only answer "Yes" and not "No" to the notification. Handling "No" is more complicated and requires V3.0 communication flows.

If the initial person contacted should continue to be contacted even if the escalated person responds, then the above examples are changed to have the following form:

joann and not dave after +04:00

To escalate for a group, any one of whom can answer to prevent the escalation, a V3.0 communication flow is needed.

Assume that you don't want the answer from one member of the group to cancel the notifications to the other members of the group, and that individuals can only answer "Yes" and not "No" to the notification. The group is ham, dave, joann and the escalation is to pat. The communication flow may be expressed as follows:

CONSULT {ham, dave, joann} races pat after +04:00

It is noted that "CONSULT" is a parallel list operator that evaluates all of its children and waits for one of them to result in a TRUE or FALSE. This result is returned as the value of the operator, but the remaining operands are placed OUT-OF-BAND so that they can continue operation but have no affect on the outcome of the overall expression. They may additionally be tagged with an OUTOFBAND label. CONSULT evaluates to NORESULT until one of its children has evaluated to a truth-value of TRUE or FALSE, it then returns that result placing the rest of its children OUT-OF-BAND. If all of its children result in a truth-value of MAYBE, then this operator results in MAYBE.

If at least one member in the consult answers then Pat never receives the escalation. If Pat receives the escalation and answers, then all messages to the group in CONSULT are cancelled. This parallels the technique above for individuals and does not use the limitation that the recipients can't answer "No."

If you want the group to continue to be notified even if the escalated person answers, then the communication flow is expressed as follows:

CONSULT {ham, dave, joann} and NOT pat after +04:00

This communication flow uses the assumption that people cannot answer "No."

For a more detailed discussion of the generation and evaluation of communication flows, see U.S. patent application Ser. No. 10/184,236, filed Jun. 26, 2002, entitled "Method and Apparatus for Automatic Notification and Response;" and U.S. patent application Ser. No. 10/184,325, filed Jun. 26, 2002, entitled "Method and Apparatus for Automatic Notification and Response Based on Communication Flow Expressions," each incorporated by reference herein.

Exemplary User Interfaces

FIG. 23 illustrates an exemplary user interface 2300 that allows a user to review one or more pending requests. In the example shown in FIG. 23, the request has three associated answers in a section 2310. Two answers have associated audio recordings 2315 and 2320. According to one aspect of the present invention, the various users that have received the subscription request can see those other users who have responded (or all optionally users who received the request). In this manner, an ad-hoc community is created that allows the users to, for example, directly consult one another, if needed. Details of the request are included in section 2320. In other words, since this group of users have received the same request, that share some common interest associated with the request.

In addition, the exemplary user interface 2300 includes the following three questions in section 2330 that allows a user to indicate whether they will take responsibility for the request:

Yes, I take responsibility for this;
No, I don't take responsibility for this case, but will follow its progress; or
No, I don't take responsibility for this case.

Figure 24:
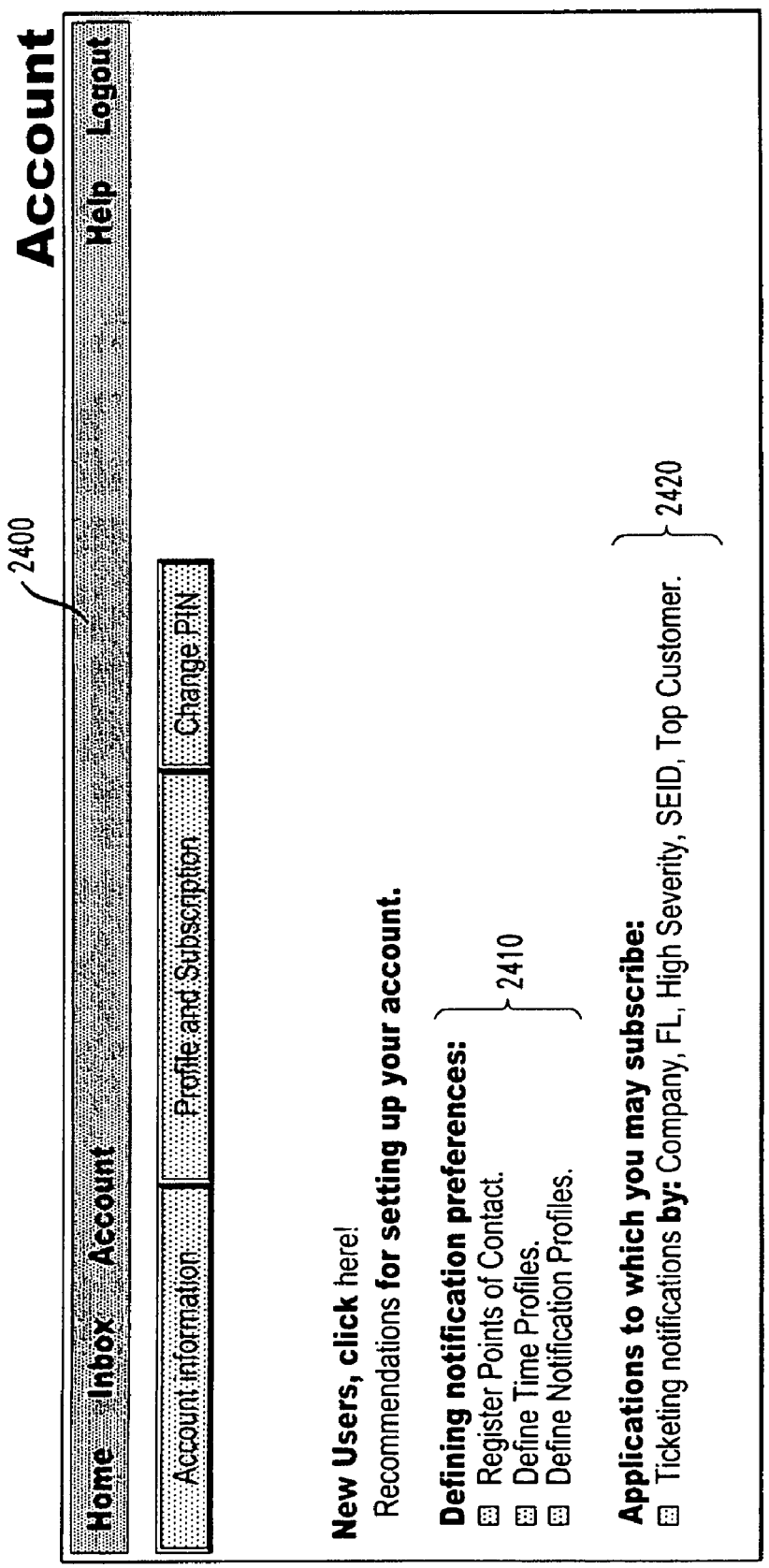
FIG. 24 illustrates an exemplary user interface that allows a user to enter, update or otherwise access subscriptions.

FIG. 24 illustrates an exemplary user interface 2400 that allows a user to enter, update or otherwise access subscriptions. In the example shown in FIG. 24, the user interface 2400 provides a first section 2410 that allows a user to define notification preferences, such as points of contact and time profiles. In addition, the user interface 2400 includes a section 2420 that allows a user to register subscriptions based on one or more different subscribable objects (i.e., those attributes identified as required attributes in the template database 1500 (FIG. 15).

FIG. 25 illustrates an exemplary user interface 2500 that allows users to view, update or delete their notification profiles. In the example shown in FIG. 25, a user has established notification profiles for 24×7, alarm setup and routine. FIG. 26 illustrates an exemplary user interface 2600 that allows users to enter a new notification profile. In the example shown in FIG. 26, a user can specify parameters in section 2610 for an initial notification and in section 2620 for a reminder.

FIG. 27 illustrates an exemplary user interface 2700 that allows a user to subscribe to notifications. In the example shown in FIG. 27, the user is registering to receive subscriptions based on FL. The user enters the desired FL number(s) in field 2720, optionally with the assistance of a search tool 2710 (for example, that lists all FL numbers having a prefix of a given size as the user enters the prefix). The entry in field 2720 is an example of an attribute having a large cardinality, as the number of possible values is too large to present the user with all the FL options in the interface 2700. The case source, message type and severity fields 2730, 2740, 2770 are examples of attributes having a small cardinality, as the number of possible values is small and all the options can be presented to the user at the same time in the interface 2700, for example, using a check box. The Product and Product Family fields 2750, 2760 are examples of attributes having a medium cardinality, as the number of possible values is between the small set and the large set, and all the options can be presented to the user in the interface 2700, for example, using a scroll list.

Figure 28:
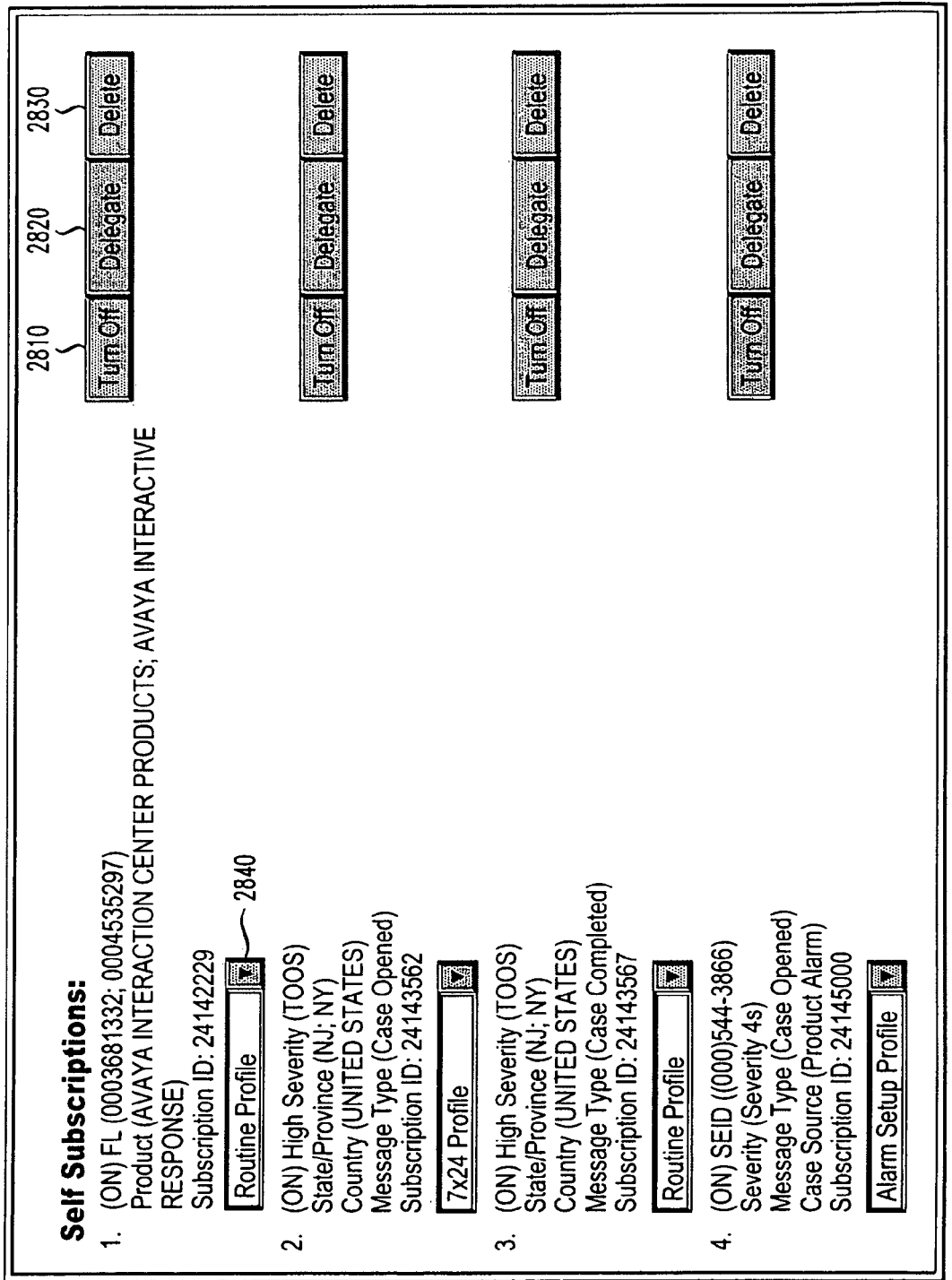

FIG. 28 illustrates an exemplary user interface 2800 that presents a list of subscriptions to the corresponding user. In the example shown in FIG. 28, the user is provided with corresponding buttons 2810, 2820, 2830 for each subscription to turn off, delegate or delete the subscription, respectively. In addition, a button 2840 is optionally provided to allow the user to specify the appropriate notification profile to employ for the subscription.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method comprising:
   identifying, at a server, a user that has entered a subscription that matches the information contained in a notification; and
   generating, at the server, a communication flow expression containing an instruction concerning the transmission of the notification; and
   transmitting, from the server, the communication flow expression to a notification and response system, wherein:
   i. the notification and response system is distinct from the server that generates the communication flow expression, and
   ii. the notification and response system executes the communication flow expression, and
   iii. the notification and response system transmits the notification in accordance with the instruction.

2. The method of claim 1, further comprising the step of receiving a request identifier back from the notification and response system.

3. The method of claim 2, further comprising the step of forwarding the request identifier to an application associated with the information.

4. The method of claim 1, further comprising the step of forwarding the communication flow expression to an application associated with the information for forwarding to a notification and response system for delivery.

5. The method of claim 1, wherein the communication flow expression comprises at least one recipient for the notification.

6. The method of claim 5, wherein the notification is delivered to the at least one recipient in accordance with a preference of the recipient.

7. The method of claim 1, wherein the communication flow expression further comprises one or more delegates for the notification.

8. The method of claim 1, wherein the communication flow expression further comprises one or more escalation events for the notification.

9. The method of claim 1, further comprising the step of determining whether the identified users have appropriate privileges associated with the information before adding the identified users to the communication flow expression.

10. The method of claim 1, further comprising the step of allowing recipients of the notification to see one another.

11. The method of claim 1, further comprising the step of allowing responders to the notification to see one another.

12. An apparatus comprising:
    a memory; and
    at least one processor, coupled to the memory, operative to:
    identify a user that has entered a subscription that matches the information contained in a notification; and
    generate a communication flow expression containing an instruction concerning the transmission of the notification; and
    provide the communication flow expression to a notification and response system wherein:
    i. the notification and response system is distinct from an entity that generates the communication flow expression, and
    ii. the notification and response system executes the communication flow expression, and
    iii. the notification and response system transmits the notification in accordance with the instruction.

13. The apparatus of claim 12, wherein the processor is further configured to receive a request identifier back from the notification and response system.

14. The apparatus of claim 13, wherein the processor is further configured to forward the request identifier to an application associated with the information.

15. The apparatus of claim 12, wherein the processor is further configured to forward the communication flow expression to an application associated with the information for forwarding to a notification and response system for delivery.

16. The apparatus of claim 12, wherein the communication flow expression comprises at least one recipient for the notification.

17. The apparatus of claim 16, wherein the notification is delivered to the at least one recipient in accordance with preferences of the recipient.

18. The apparatus of claim 12, wherein the processor is further configured to determine whether the identified users have appropriate privileges associated with the information before adding the identified users to the communication flow expression.

19. An article of manufacture for notifying one or more users of information, comprising a computer recordable medium containing one or more programs which when executed implement the steps of:

identifying one or more of the users that has entered a subscription that matches the information; and generating a communication flow expression containing an instruction concerning the transmission of the notification; and providing the communication flow expression to a notification and response system, wherein:

i. the notification and response system is distinct from an entity generates the communication flow expression, and ii. the notification and response system executes the communication flow expression, and iii. the notification and response system transmits the notification in accordance with the instruction.

\* \* \* \* \*